US011559765B2

(12) United States Patent
Ball et al.

(10) Patent No.: US 11,559,765 B2
(45) Date of Patent: *Jan. 24, 2023

(54) SYSTEMS AND METHODS FOR RECOVERING WATER USING A REFRIGERATION SYSTEM OF A WATER RECOVERY SYSTEM

(71) Applicant: SunToWater Technologies, LLC, San Francisco, CA (US)

(72) Inventors: James Ball, Hamilton (CA); Charles Becze, Oakville (CA)

(73) Assignee: SUNTOWATER TECHNOLOGIES, LLC, San Francisco, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 16/667,118

(22) Filed: Oct. 29, 2019

(65) Prior Publication Data

US 2021/0121822 A1   Apr. 29, 2021

(51) Int. Cl.
| | |
|---|---|
| *B01D 53/26* | (2006.01) |
| *E03B 3/28* | (2006.01) |
| *B01D 1/00* | (2006.01) |
| *B01D 5/00* | (2006.01) |
| *B01D 53/14* | (2006.01) |

(52) U.S. Cl.
CPC ......... *B01D 53/263* (2013.01); *B01D 1/0082* (2013.01); *B01D 5/006* (2013.01); *B01D 5/0051* (2013.01); *B01D 53/1418* (2013.01); *B01D 53/1493* (2013.01); *E03B 3/28* (2013.01); *B01D 2252/10* (2013.01)

(58) Field of Classification Search
CPC ................. E03B 3/28; Y02A 20/00

USPC ............ 62/93; 261/94–96, 128; 95/10, 149, 95/178; 96/234, 242, 244
See application file for complete search history.

(56) References Cited

U.S. PATENT DOCUMENTS

| | | | | |
|---|---|---|---|---|
| 6,156,102 A | * | 12/2000 | Conrad ................. | B01D 53/18 |
| | | | | 95/193 |
| 8,882,888 B2 | * | 11/2014 | Ball ....................... | F25B 37/00 |
| | | | | 95/231 |
| 9,114,354 B2 | * | 8/2015 | Ball ....................... | F25B 17/02 |
| 9,617,719 B2 | | 4/2017 | Sawyer et al. | |
| 10,071,918 B2 | * | 9/2018 | Ackerman ............. | B01D 5/006 |
| 10,532,935 B2 | * | 1/2020 | Ackerman ............. | B01D 5/006 |

(Continued)

FOREIGN PATENT DOCUMENTS

WO     20190115870 A1     6/2019

OTHER PUBLICATIONS

International Search Report & Written Opinion relating to PCT/US2020/055977 filed Oct. 16, 2020, dated Jan. 27, 2021.

*Primary Examiner* — Nina Bhat
(74) *Attorney, Agent, or Firm* — Dinsmore & Shohl LLP

(57) ABSTRACT

Systems and methods for operating a water recovery system are described and include activating a condenser of the water recovery system. The method includes measuring a temperature associated with the condenser based on data obtained from a condenser temperature sensor. The method includes comparing the temperature associated with the condenser to a maximum threshold temperature. The method includes activating an auxiliary condenser of the water recovery system in response to the temperature associated with the condenser being greater than the maximum threshold temperature.

19 Claims, 14 Drawing Sheets

(56) References Cited

U.S. PATENT DOCUMENTS

| | | | |
|---|---|---|---|
| 11,125,448 B2* | 9/2021 | Lee | F24F 13/222 |
| 11,285,435 B2* | 3/2022 | Friesen | B01D 5/0069 |
| 2008/0168789 A1 | 7/2008 | Jones et al. | |
| 2011/0232485 A1* | 9/2011 | Ellsworth | B32B 5/18 |
| | | | 95/91 |
| 2013/0319244 A1* | 12/2013 | Ball | B01D 53/263 |
| | | | 96/111 |
| 2013/0319245 A1* | 12/2013 | Ball | B01D 53/263 |
| | | | 96/112 |
| 2014/0138236 A1* | 5/2014 | White | C02F 1/04 |
| | | | 202/185.1 |
| 2014/0245769 A1* | 9/2014 | Vandermeulen | F24F 3/1417 |
| | | | 62/238.3 |
| 2015/0040591 A1* | 2/2015 | Lim | F25B 5/02 |
| | | | 62/118 |
| 2016/0083936 A1* | 3/2016 | Martin | E03B 3/28 |
| | | | 261/131 |
| 2016/0129369 A1* | 5/2016 | Dorfman | F24F 3/1405 |
| | | | 62/189 |
| 2018/0030695 A1* | 2/2018 | Ng | F24F 3/153 |
| 2018/0169571 A1* | 6/2018 | Stuckenberg | B01D 53/002 |
| 2019/0100903 A1* | 4/2019 | Panda | C02F 1/32 |
| 2019/0242097 A1 | 8/2019 | Rockenfeller et al. | |

\* cited by examiner

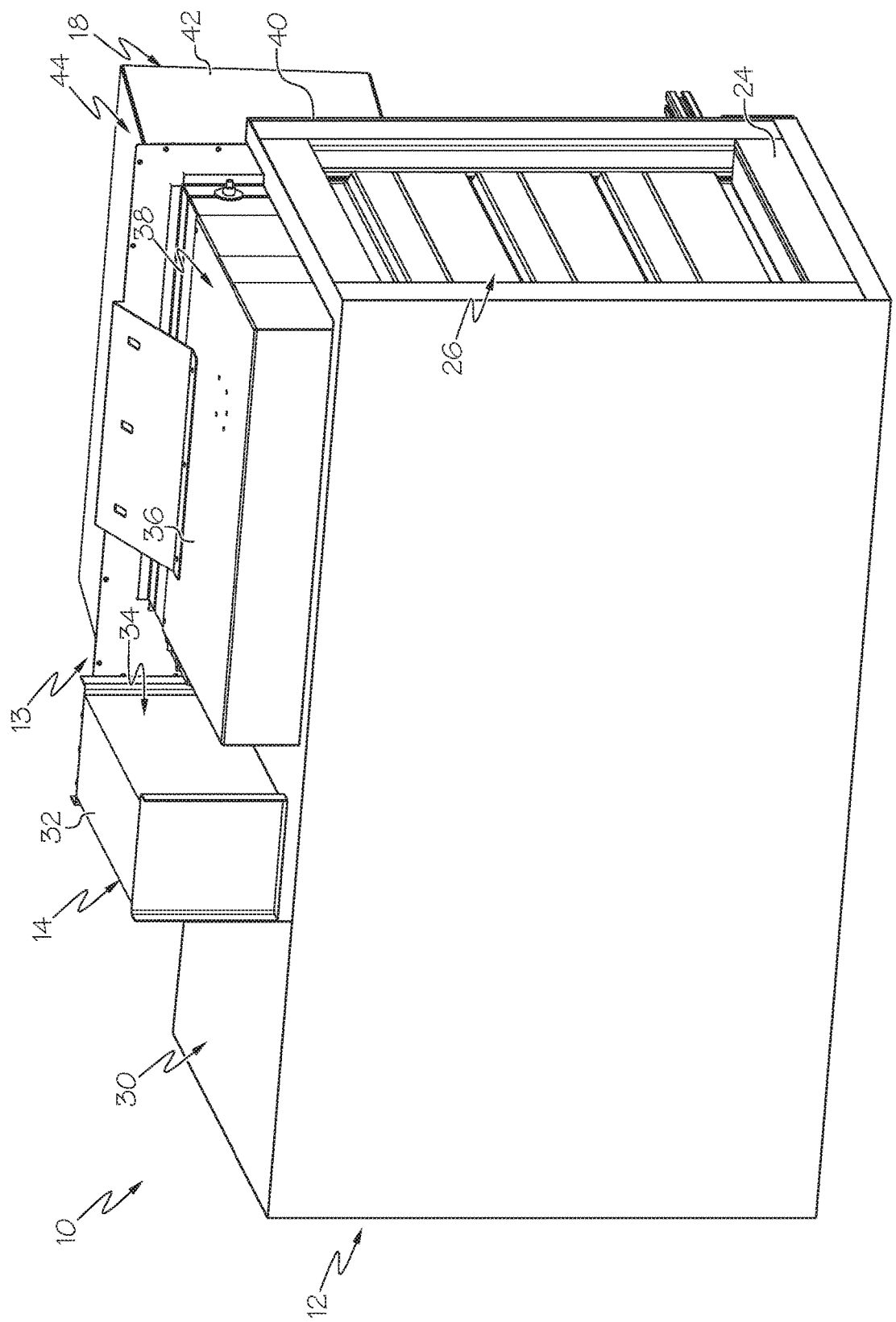

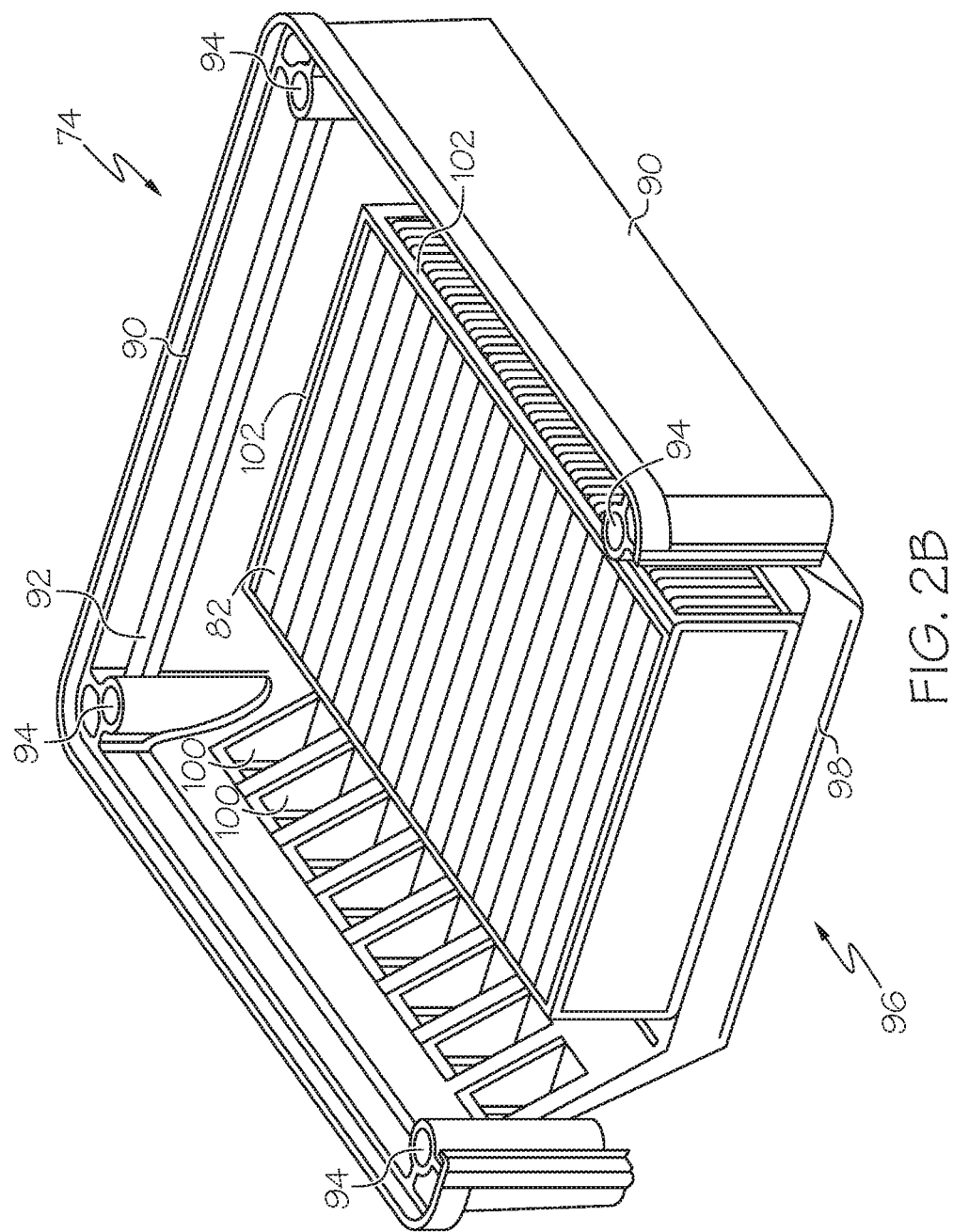

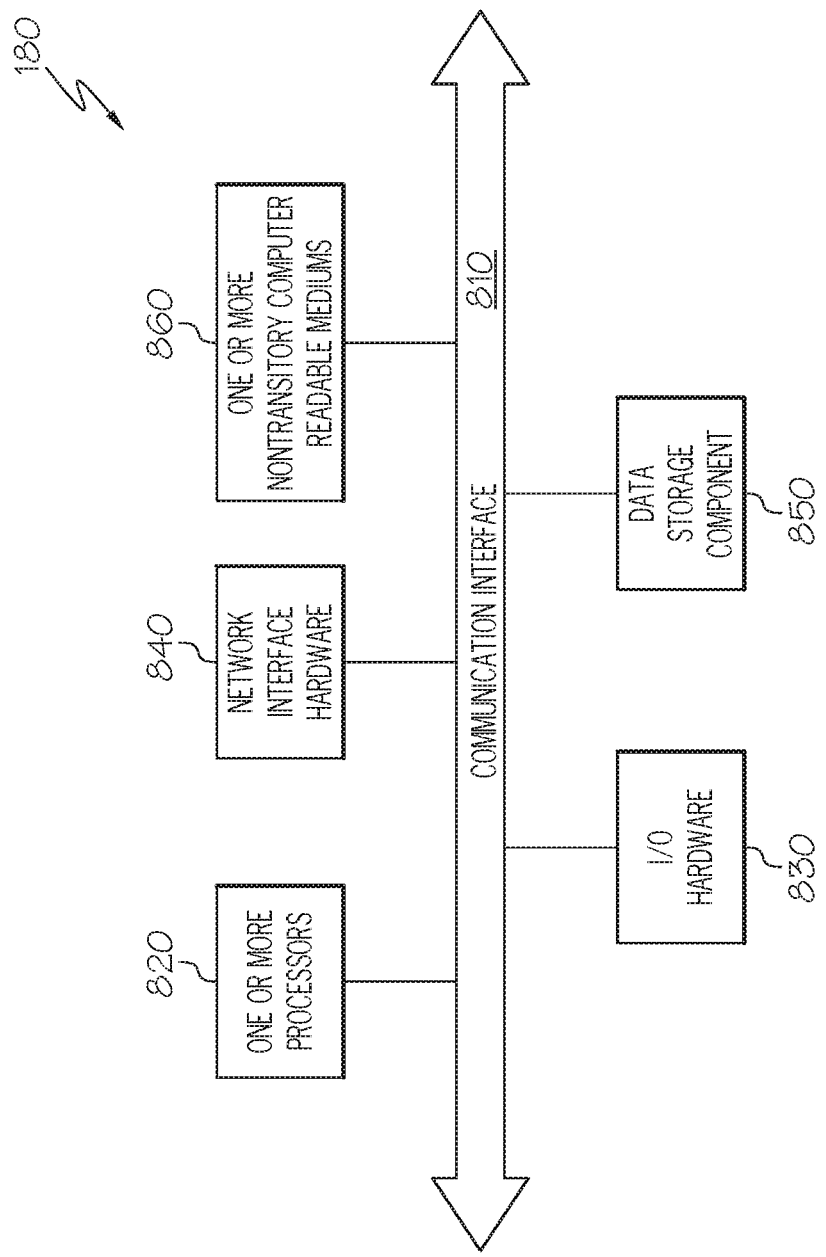

SYSTEMS AND METHODS FOR RECOVERING WATER USING A REFRIGERATION SYSTEM OF A WATER RECOVERY SYSTEM

FIELD

The present specification generally relates to water recovery systems, and more particularly, to systems and methods for recovering water from ambient air using water recovery systems that include refrigeration systems.

BACKGROUND

Potable water may be difficult to obtain in many locations throughout the world. In arid climates, there may be a shortage of water, and if water is available, it may be difficult to make the water potable water without extensive water treatment resources. In wet climates, potable water may be in short supply due to the lack of treatment equipment.

There are a number of known solutions for obtaining potable water by removing water vapor from the ambient air, such as the use of solid and liquid desiccants for extracting water from air. As an example, ambient air is passed through a chamber containing a desiccant soaked media. As the air contacts the desiccant soaked media, moisture from the air stream is removed by absorption into the desiccant. Heat is then applied to the desiccant soaked media to vaporize the captured moisture. The water vapor is transported away from the chamber, and then it is condensed and collected.

Water recovery systems may include at least one of a solid desiccant and a liquid desiccant. In liquid desiccant systems, the media may be sprayed with a liquid desiccant in order to increase the exposed surface area of the desiccants to the air stream and to maximize water vapor removal. However, a misting device adds to the complexity and cost of the system. Moreover, while systems with solid forms of desiccants may provide a more compact construction, solid desiccants have relatively small exposed surface areas, thereby limiting the capability to remove water vapor from a passing air stream.

Accordingly, there is a need for a water recovery system and method that maximizes an amount of water recovered from an ambient air stream.

SUMMARY

In one another embodiment, a method of operating a water recovery system includes activating, by one or more processors, a condenser of the water recovery system. The method includes measuring, by the one or more processors, a temperature associated with the condenser based on data obtained from a condenser temperature sensor. The method includes comparing, by the one or more processors, the temperature associated with the condenser to a maximum threshold temperature. The method includes activating, by the one or more processors, an auxiliary condenser of the water recovery system in response to the temperature associated with the condenser being greater than the maximum threshold temperature.

In another embodiment, a water recovery system includes one or more processors; and one or more non-transitory memory modules communicatively coupled to the one or more processors. The non-transitory memory modules store machine-readable instructions that, when executed, cause the one or more processors to activate a condenser of the water recovery system. The non-transitory memory modules store machine-readable instructions that, when executed, cause the one or more processors to measure a temperature associated with the condenser based on data obtained from a condenser temperature sensor. The non-transitory memory modules store machine-readable instructions that, when executed, cause the one or more processors to compare the temperature associated with the condenser to a maximum threshold temperature. The non-transitory memory modules store machine-readable instructions that, when executed, cause the one or more processors to activate an auxiliary condenser of the water recovery system in response to the temperature associated with the condenser being greater than the maximum threshold temperature.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 1A schematically depicts a perspective view of an example water recovery system according to one or more embodiments shown and described herein;

FIG. 2B schematically depicts another perspective view of the example desiccant tray with the desiccant media cartridge mounted within the tray according to one or more embodiments shown and described herein;

FIG. 8 schematically depicts an example controller of a water recovery system according to one or more embodiments shown and described herein.

DETAILED DESCRIPTION

Figure 1B:
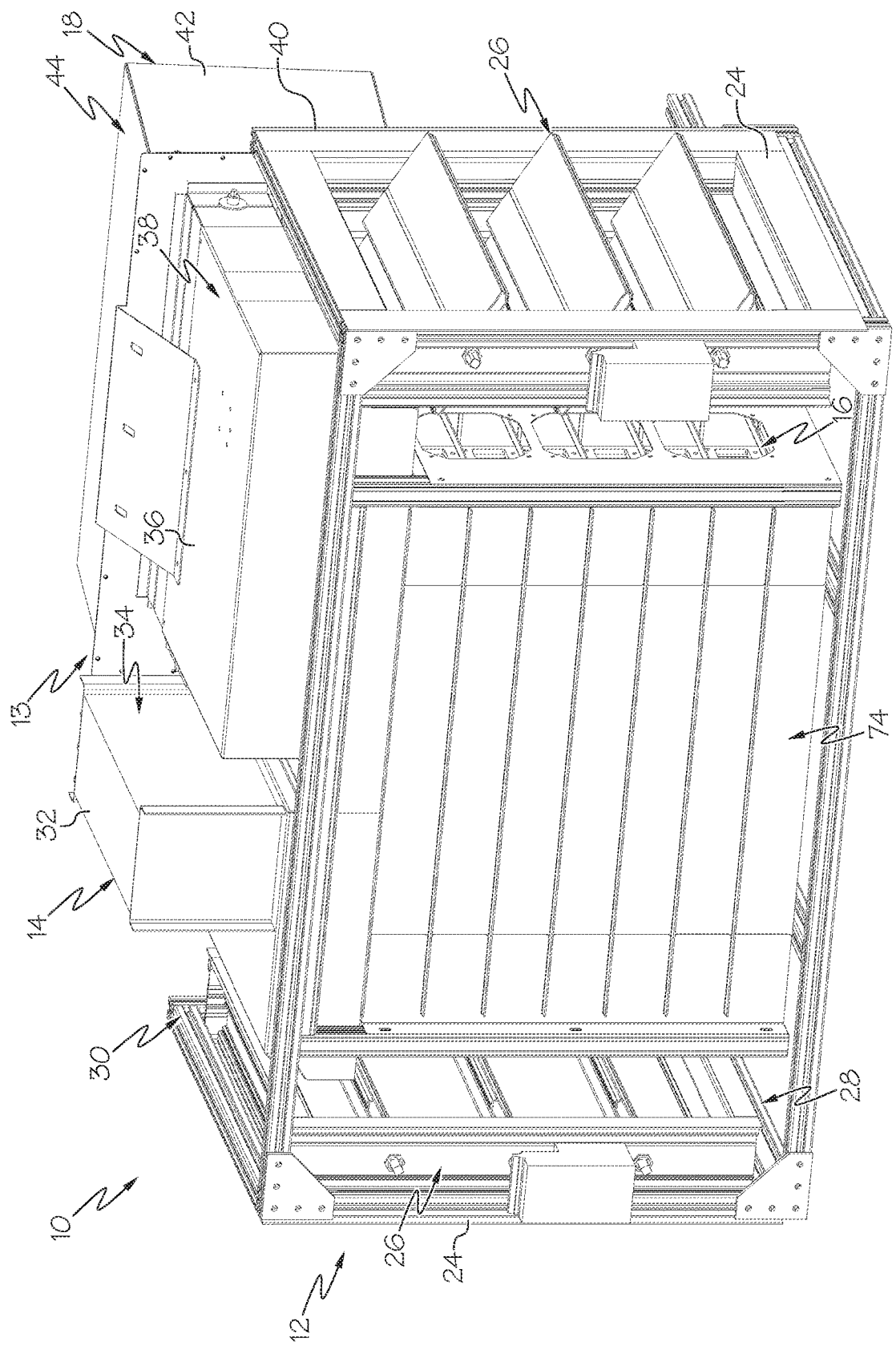
FIG. 1B schematically depicts a perspective view of example components located within a housing of a water recovery system according to one or more embodiments shown and described herein.

Referring to the figures, embodiments of the present disclosure are generally related to water recovery systems that include refrigeration systems. The water recovery systems are configured to recover water from an ambient air stream. As described below in further detail, the water recovery system is operable in various modes. As a non-limiting example, the water recovery system may be operable in an absorption mode and an extraction mode. During the absorption mode, an ambient air stream is directed into a desiccant stack located within a chamber of the water recovery system. The desiccant stack absorbs and retains the water vapor in the ambient air stream using a media material that holds the desiccant media of the desiccant stack.

Furthermore, a refrigeration system may be activated during the absorption mode. As a non-limiting example, the ambient air stream may be directed to the refrigeration system through one or more dampers. In response to receiving the ambient air stream, the refrigeration system may be configured to lower a temperature of the ambient air stream. By lowering the temperature of the ambient air stream, the relative humidity of the ambient air stream increases. Accordingly, increasing the relative humidity entering the desiccant stack enables the desiccant stack to absorb and retain increased amounts of water vapor.

Once the media material has absorbed a sufficient amount of water from the ambient air stream, the water recovery system may transition to the extraction mode. During the extraction mode, the chamber is isolated from the ambient air, and heat energy is added within the chamber using the refrigeration system in order to vaporize the water from the desiccant stack. In addition to supplying the heat energy, the refrigeration system may lower the interior pressure of the chamber in order lower the evaporation temperature required to vaporize the water. When the internal temperature of the chamber exceeds a dew point temperature relative to the external ambient temperature, the refrigeration system is configured to condense the water vapor from the internal chamber air.

The condensed water may then be captured and treated in order to make the water potable. As an example, the recovered water may be filtered, exposed to an ultra violet light source, mineralized, chlorinated, or may be otherwise treated to make the water safe for consumption.

In embodiments described herein, the water recovery system may include a controller that is configured to activate, monitor, and control various components of the water recovery system and the refrigeration system. As a non-limiting example and as described below in further detail, the controller may be configured to set the water recovery system to one of the absorption mode and the extraction mode based on one or more operating characteristics of the water recovery system and/or refrigeration system. As another non-limiting example, the controller may obtain sensor data from a plurality of sensors to determine an amount of water in the water recovery system, a power consumption of the water recovery system, an amount of power stored of the water recovery system, ambient and internal temperatures, pressures, and humidity data, and/or various refrigeration system operating characteristics. Accordingly, the controller may be configured to optimize the efficiency and water recovery rate of the water recovery system based on the sensor data. Furthermore, the controller may be configured to optimize the efficiency and water recovery rate of the water recovery system by selectively setting the water recovery system to one of the absorption and extraction modes based on one or more operating characteristics of the water recovery system and/or the refrigeration system.

Referring now to FIG. 1A, a perspective view of an example water recovery system 10 is schematically depicted. In some embodiments, the water recovery system 10 may include a desiccant stack housing 12 including a plurality of desiccant stacks 74 and a refrigeration system 13. The refrigeration system 13 may include an auxiliary condenser 14, one or more fans 16, an evaporator 18, an internal condenser 20, and a compressor 22. It should be understood that in other embodiments, the water recovery system 10 may include additional components and is not limited to the components described herein.

In some embodiments, the desiccant stack housing 12 may include a pair of sidewall portions 24 with one or more dampers 26 disposed thereon. The one or more dampers 26 are configured to, in response to receiving a signal from a controller (shown below in FIG. 4), set the one or more dampers 26 to one of an open position and a closed position. As a non-limiting example and as schematically depicted in FIG. 1B, the one or more dampers 26 may be set to the open position when the controller determines that the water recovery system 10 is in the absorption mode. As another non-limiting example and as schematically depicted in FIG. 1A, the one or more dampers 26 may be set to the closed position when the controller determines that the water recovery system 10 is in the extraction mode. In order to set the one or more dampers 26 to the open and closed positions, the one or more dampers 26 may be in communication with one or more actuators (not shown), such as an electric actuator, pneumatic actuator, hydraulic actuator, etc.

As used herein, the phrase "disposed on" can describe a spatial or functional relationship between two or more elements. Unless explicitly described as being "direct," the relationship can be a direct relationship where no other intervening elements are present between the first and second elements, but can also be an indirect relationship where one or more intervening elements are present (either spatially or functionally) between the first and second elements.

In some embodiments, the desiccant stack housing 12 includes a plurality of desiccant stacks 74 disposed therein. As a non-limiting example, the plurality of desiccant stacks 74 may be stacked vertically in a single column configuration. As another non-limiting example, the plurality of desiccant stacks 74 may be stacked vertically and horizontally in multiple columns, thereby forming a combination of horizontal rows and vertical columns. The plurality of desiccant stacks 74 is configured to absorb and retain water vapor of the ambient air stream using a media material.

As described below in further detail with reference to FIGS. 3A-3C, by setting the one or more dampers 26 to the open position when the water recovery system 10 is in the absorption mode, an ambient air stream may be directed to the plurality of desiccant stacks 74 located within a chamber 28 of the water recovery system 10 (shown in FIG. 1B). As described below in further detail with reference to FIG. 3C, by setting the one or more dampers 26 to the closed position when the water recovery system 10 is in the extraction mode, the chamber 28 of the water recovery system 10 may be isolated from the ambient air. Furthermore, the refrigeration system 13 may provide energy within the chamber 28 to vaporize the water from the plurality of desiccant stacks 74, as described below in further detail.

While the above embodiments illustrate one or more dampers 26 disposed on the pair of sidewall portions 24, it should be understood that in other embodiments, the pair of sidewall portions 24 may include one or more valves that are configured to selectively enable the ambient air stream to be directed into the chamber 28 of the desiccant stack housing 12.

In some embodiments, the auxiliary condenser 14 may be disposed on an upper portion 30 of the desiccant stack housing 12. As a non-limiting example, the auxiliary condenser 14 may include an auxiliary condenser housing 32 and one or more auxiliary condenser coils 34 disposed therein. Furthermore, a chamber defined by the auxiliary condenser housing 32 may be in communication with the chamber 28 of the desiccant stack housing 12. As described below in further detail with reference to FIGS. 4-7, the one or more auxiliary condenser coils 34 of the auxiliary condenser 14 may be activated by the controller in order to control a temperature of the water recovery system 10.

In some embodiments, at least one of the one or more fans 16 may be disposed on the upper portion 30 of the desiccant stack housing 12. As shown in the illustrated embodiments, a centrifugal fan 38 may be disposed on upper portion 30 of the desiccant stack housing 12. The centrifugal fan 38 may be disposed within a fan housing 36, and a chamber defined by the fan housing 36 may be in communication with the chamber 28 of the desiccant stack housing 12. As described below in further detail with reference to FIGS. 3A-3B, the centrifugal fan 38 may be configured to direct the ambient air stream received by the evaporator 18 to the plurality of desiccant stacks 74 when the water recovery system 10 is in the absorption mode.

Figure 1C:
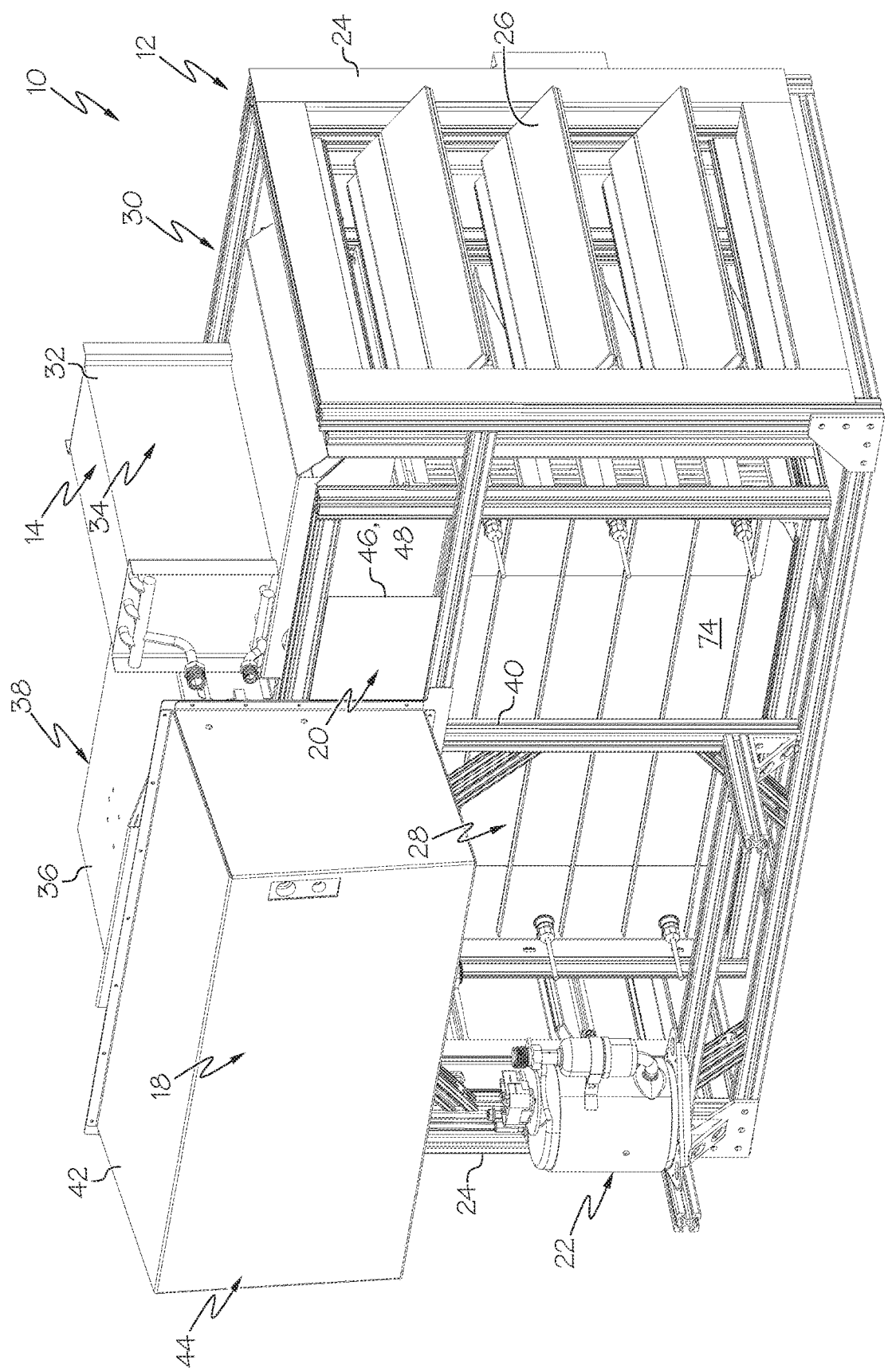
FIG. 1C schematically depicts a perspective view of an example refrigeration system of a water recovery system according to one or more embodiments shown and described herein.

As shown in the illustrated embodiment of FIG. 1C, the evaporator 18 may be disposed on a side portion 40 of the desiccant stack housing 12. As a non-limiting example, the evaporator 18 may include an evaporator housing 42 and one or more evaporator coils 44 disposed therein. Furthermore, a chamber defined by the evaporator housing 42 may be in communication with the chamber 28 of the desiccant stack housing 12 and the chamber defined by the fan housing 36. As described below in further detail with reference to FIGS. 4-7, the one or more evaporator coils 44 of the evaporator 18 may be configured to receive and lower a temperature of the ambient air stream when the water recovery system 10 is in the absorption mode.

In some embodiments, the internal condenser 20 may be located within the chamber 28 defined by the desiccant stack housing 12. As a non-limiting example, the internal condenser 20 may include an internal condenser housing 46 and one or more internal condenser coils 48 disposed therein. Furthermore, a chamber defined by the internal condenser housing 46 may be in communication with the chamber 28 of the desiccant stack housing 12. As described below in further detail with reference to FIGS. 4-7, the one or more internal condenser coils 48 of the internal condenser 20 may be activated by the controller in order to provide heat energy to the plurality of desiccant stacks 74 when the water recovery system 10 is in the extraction mode.

In some embodiments, the compressor 22 may be located within the chamber 28 defined by the desiccant stack housing 12. As a non-limiting example, the compressor 22 may be one of a positive displacement compressor (e.g., a reciprocating compressor, an ionic liquid piston compressor, a rotary screw compressor, a rotary vane compressor, a rolling piston compressor, a scroll compressor, a diaphragm compressor, etc.), a dynamic compressor (e.g., an air bubble compressor, a centrifugal compressor, a diagonal or mixed-flow compressor, an axial compressor, etc.), a hermetically sealed compressor, or a semi-hermetic compressor. The operation of the compressor 22 is described below in further detail with reference to FIG. 4.

It should be understood that the arrangement of the various components of the water recovery system 10 illustrated in FIGS. 1A-1C are merely illustrative and are not limited to the embodiments described herein. Therefore, it should be understood that the various components of the refrigeration system 13 and the plurality of desiccant stacks 74 may have be disposed at various locations within or on the desiccant stack housing 12 and may have various orientations. As a non-limiting example, the auxiliary condenser 14 may be located within the desiccant stack housing 12 in other embodiments.

Figure 2A:
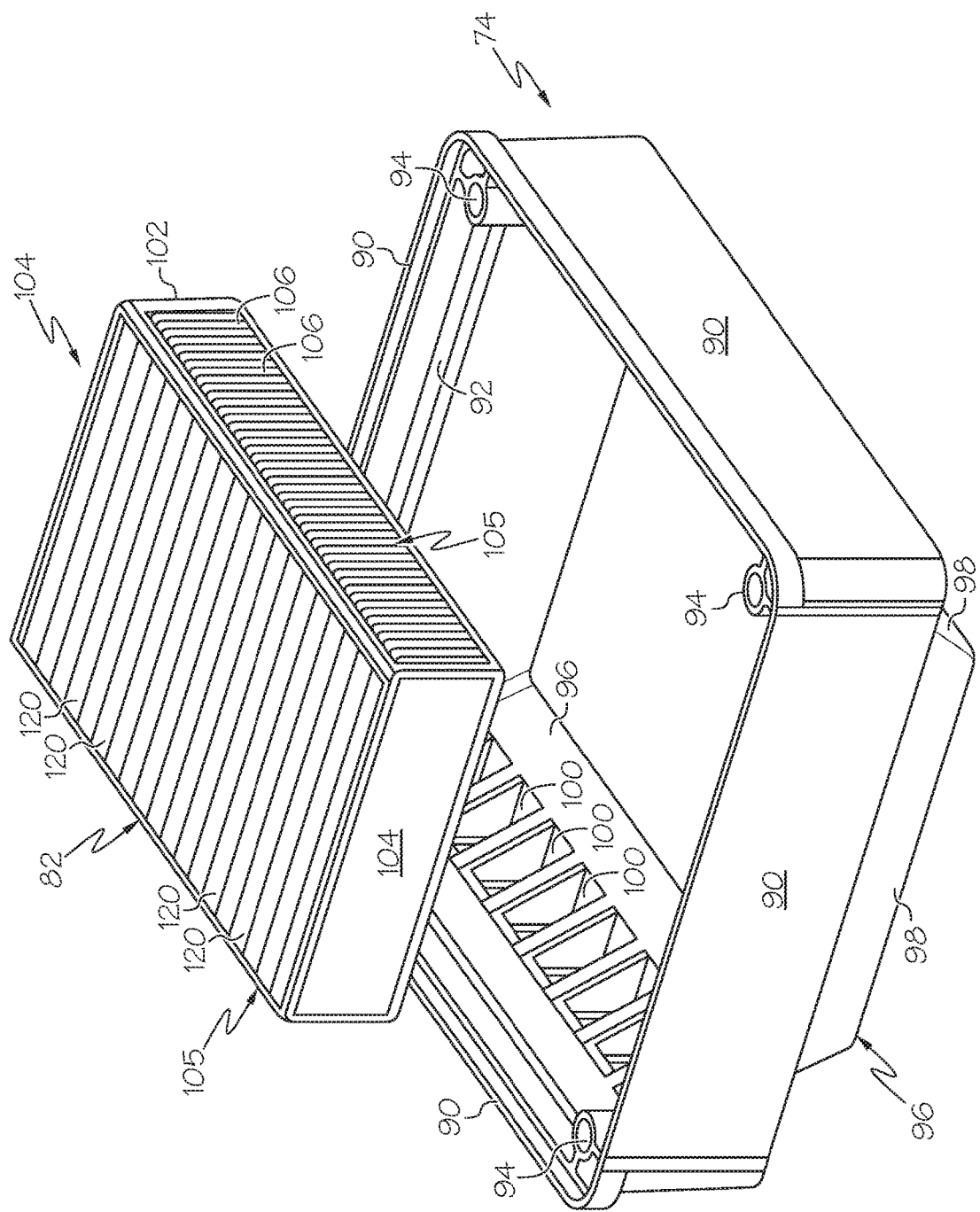
FIG. 2A schematically depicts an exploded perspective view of an example desiccant tray and an example desiccant media cartridge according to one or more embodiments shown and described herein.

With reference to FIG. 2A, an exploded perspective view of an example desiccant stack 74-1 of the plurality of desiccant stacks 74 and an example desiccant media cartridge 82 is schematically depicted. In some embodiments, the desiccant stack 74-1 includes sidewalls 90 and a base 96. One or more of the sidewalls 90 may include rod-receiving channels 94 that are configured to receive rods or dowels (not shown) that stabilize the connection between a plurality of desiccant stacks 74. Furthermore, the one or more sidewalls 90 may include an interior flange 92 for mounting a sealing gasket (not shown). As a non-limiting example, a sealing gasket may be placed between the desiccant stack 74-1 and other desiccant trays of the plurality of desiccant stacks 74 to limit airflow loss through the chamber 28 of the desiccant stack housing 12.

Figure 2C:
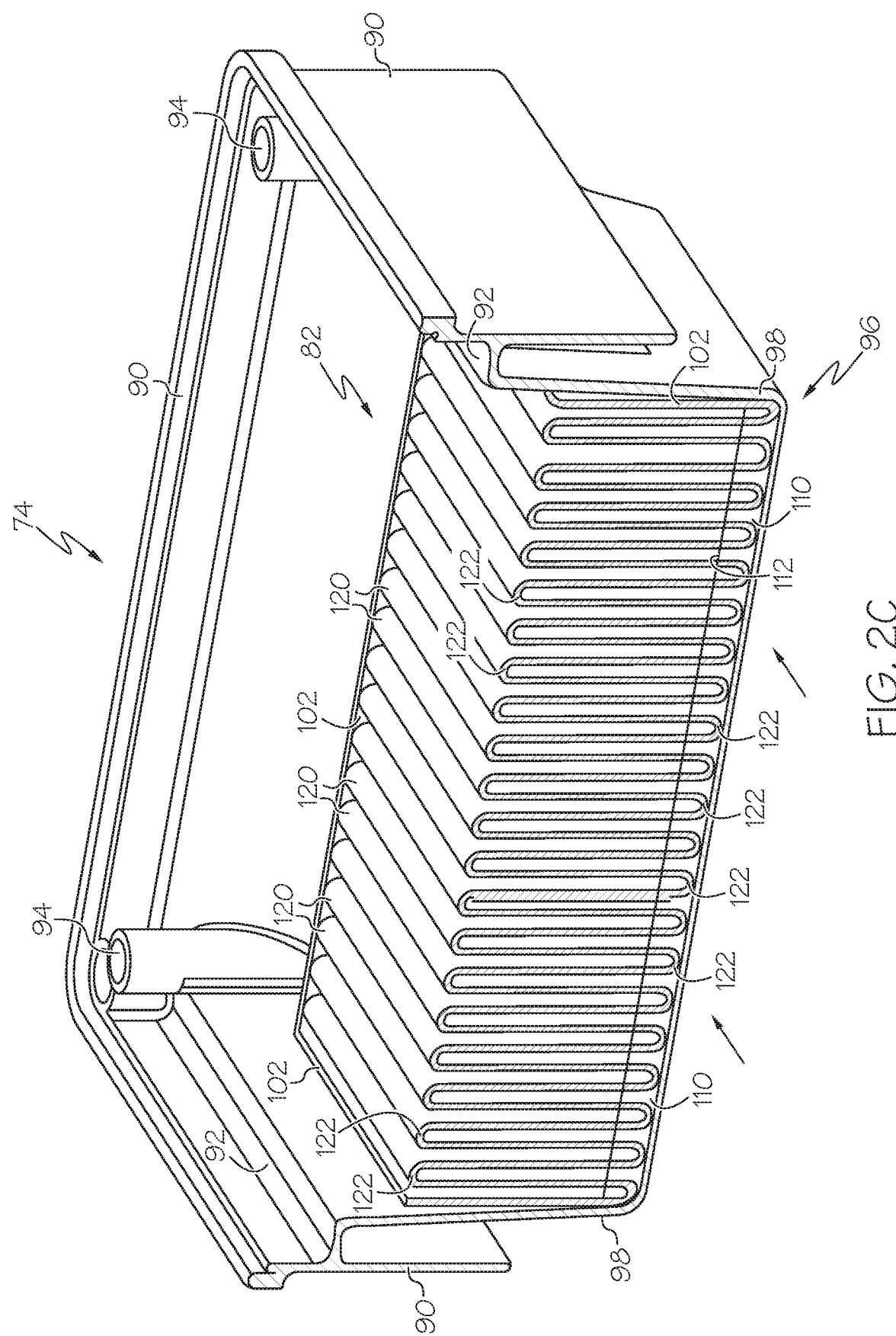
FIG. 2C schematically depicts a cross-sectional view of the example desiccant tray and example desiccant media cartridge illustrated in FIG. 2A according to one or more embodiments shown and described herein.

In some embodiments, the base 96 may include base sidewalls 98, and one or more of the base sidewalls 98 may include openings 100. As shown in the illustrated embodiment of FIG. 2A, the openings 100 may be disposed at an upper portion of base sidewalls 98 and below a top edge 101 of the sidewalls 90. In some embodiments and as shown in FIG. 2C (which is a cross-sectional view of the desiccant stack 74-1 illustrated in FIG. 2A along line 2C-2C), the openings 100 may be disposed above a liquid line 112 of a liquid desiccant solution 110.

In various embodiments, the liquid desiccant solution 110 may include a liquid hygroscopic desiccant. As a non-limiting example, the liquid desiccant solution 110 may include calcium chloride, lithium bromide, magnesium chloride, lithium chloride, and/or other similar hygroscopic desiccants. In some embodiments, the liquid desiccant solution 110 may initially be in a solid phase before transitioning to a liquid phase. As a non-limiting example, the desiccant media cartridge 82 may be pre-soaked with the liquid desiccant solution 110, and the desiccant media cartridge 82 may then be dried prior to use. In some embodiments, the liquid desiccant solution 110 may be replaced or supplemented with a solid desiccant material.

It should be understood that the term "liquid desiccant solution" refers to a desiccant chemical that may initially be deployed with a liquid component to form the solution. In some embodiments, the desiccant chemical may dry within the desiccant media cartridge 82 during the extraction mode, and therefore, the liquid desiccant solution 110 may become a semi-solid/gel or a solid. During a subsequent absorption cycle, the desiccant chemical may then be re-wetted and return to a liquid phase.

As schematically depicted in FIG. 2B, the desiccant media cartridge 82 may be disposed within the desiccant stack 74-1. As a non-limiting example, the desiccant media cartridge 82 may have a rectangular shape and may be disposed within the base sidewalls 98. It should be understood that the desiccant media cartridge 82 may have other shapes and/or orientations in other embodiments.

In some embodiments and as illustrated in FIGS. 2A-2B, the desiccant media cartridge 82 may include a media frame 102 that supports media material 120 in an accordion folded configuration. An internal wire support 122 may stabilize the media material 120 and maintain the media material 120 in the accordion folded configuration with uniform gaps or spaces between the folds of the media material 120. Furthermore, the media frame 102 may include one or more frame panels 104 that are configured to direct airflow through the chamber 28 by preventing air from passing through the panels 104. Accordingly, the media frame 102 may include a pair of open sides 105 that enable air to flow through the desiccant media cartridge 82. In order to stabilize the open sides 105, the media frame 102 may further include screen supports 106 comprising a plurality of wire elements.

A thickness of the media material 120, as well as the configuration of the media material 120 (e.g., a size of a gaps between folds of the media material 120) may be adjusted to obtain various water recovery characteristics. As a non-limiting example, sheets of the media material 120 having larger gaps between folds may provide better airflow through the chamber 28, thereby reducing the airflow pressure drop through the chamber 28. As another non-limiting example, increasing a width of the sheets of the media material 120 and reducing a size of the gaps between folds may provide increased water removal capability from the air stream.

Figure 3A:
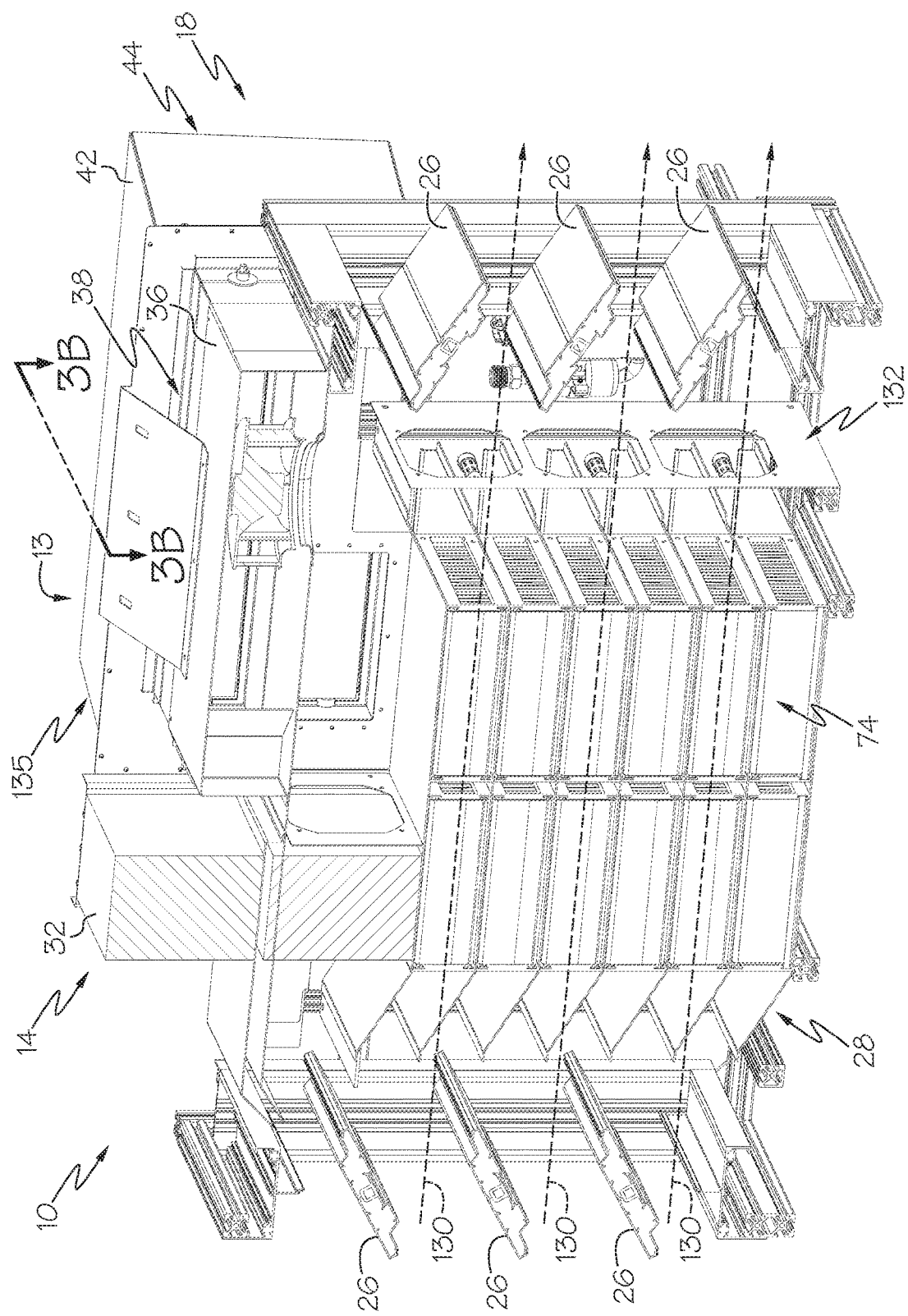
FIG. 3A schematically depicts a perspective view of an example water recovery system in an absorption mode according to one or more embodiments shown and described herein.

With reference to FIG. 3A, a perspective view of the water recovery system 10 in the absorption mode is schematically depicted. As described above, by setting the one or more dampers 26 to the open position when the water recovery system 10 is in the absorption mode, an ambient air stream 130 may be directed to the plurality of desiccant stacks 74 located within a chamber 28 of the water recovery system 10. In some embodiments, the one or more fans 16 may include a plurality of desiccant stack fans 132 configured to direct the ambient air stream 130 over the plurality of desiccant stacks 74 when the water recovery system 10 is in the absorption mode, as shown in the illustrated embodiment of FIG. 3B (which is a cross-sectional view of the water recovery system 10 illustrated in FIG. 3A along line 3B-3B). As described above, the plurality of desiccant stacks 74 is configured to absorb and retain water vapor of the ambient air stream 130.

Furthermore, when the water recovery system 10 is in the absorption mode, at least a portion of the refrigeration system 13 may be activated. As a non-limiting example, the evaporator 18, the compressor 22, and the auxiliary condenser 14 may be activated when the water recovery system 10 is set to the absorption mode. When the water recovery system 10 is set to the absorption mode, the compressor 22 may begin executing the refrigeration cycle by compressing a liquid refrigerant (e.g., Freon) and outputting the refrigerant to the auxiliary condenser 14 as a superheated vapor. Subsequently, the auxiliary condenser 14 may cool the superheated vapor refrigerant and condense the vapor refrigerant into a liquid phase by removing additional heat at constant pressure and temperature. The liquid refrigerant exiting the auxiliary condenser 14 may then be provided to the evaporator 18 through an expansion valve (shown below in FIG. 4), which is configured to lower the pressure of the liquid refrigerant exiting the auxiliary condenser 14. Lowering the pressure of the liquid refrigerant causes a portion of the refrigerant to transition into a vapor refrigerant. The liquid refrigerant and vapor refrigerant mixture is then provided to the evaporator 18, which is configured to vaporize the refrigerant by cooling the surrounding air of the refrigeration system 13 (e.g., air in the chamber 28 and/or within the evaporator housing 42). The vapor refrigerant is subsequently provided to the compressor 22, which may repeat the refrigeration cycle by compressing the vapor refrigerant and then converting the vapor refrigerant into a superheated vapor.

Figure 3B:
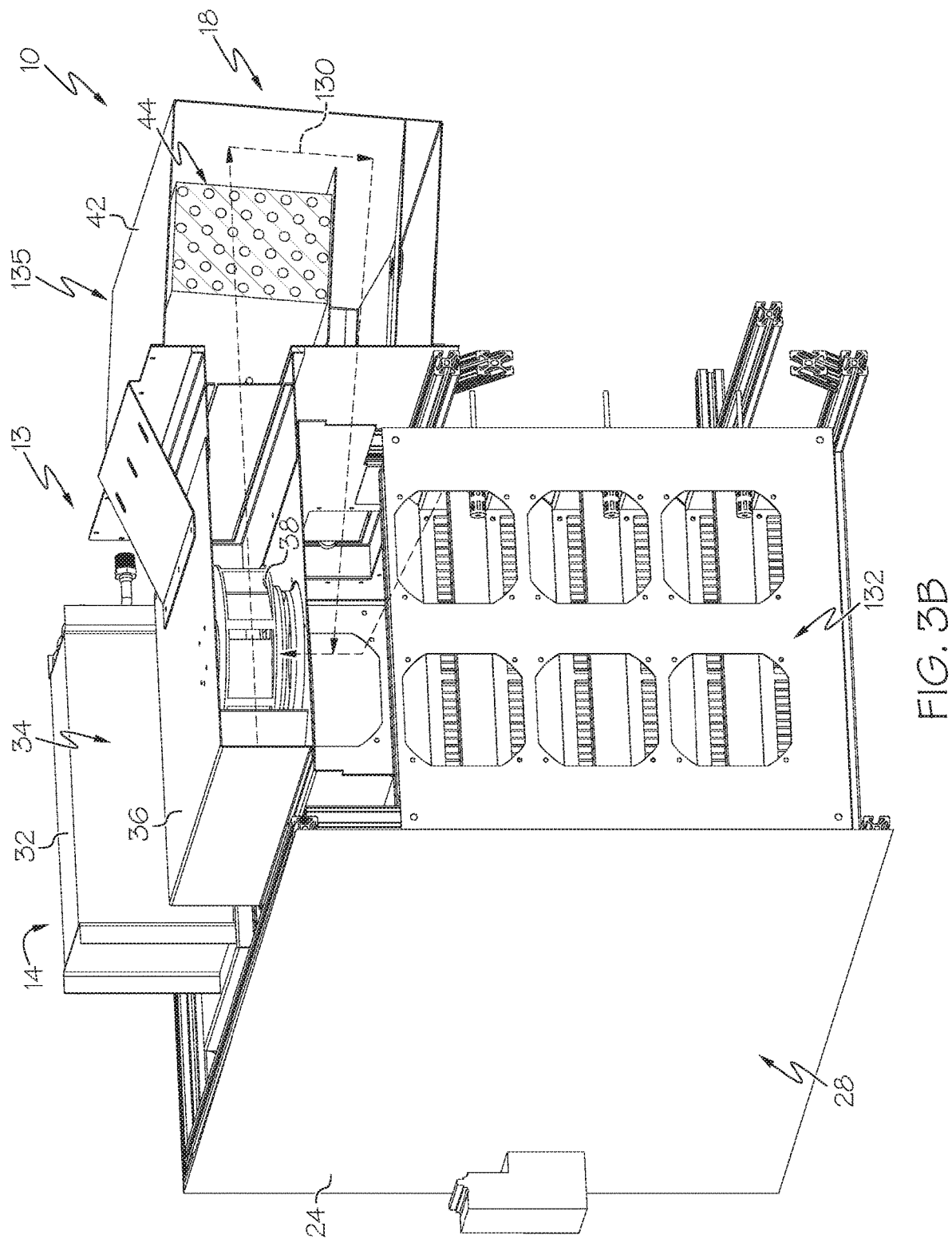
FIG. 3B schematically depicts a cross-sectional view of the water recovery system illustrated in FIG. 3A according to one or more embodiments shown and described herein.

When the evaporator 18, the compressor 22, and the auxiliary condenser 14 are activated in the absorption mode, the evaporator housing 42 may be configured to, using one or more dampers 135 disposed thereon, direct the ambient air stream 130 into the evaporator housing 42, as illustrated in FIG. 3B. Furthermore, the centrifugal fan 38 may be configured to direct the ambient air stream 130 into the evaporator housing 42 and over the one or more evaporator coils 44 of the evaporator 18. By directing the ambient air stream 130 over the one or more evaporator coils 44, the evaporator 18 may vaporize the refrigerant, thereby enabling proper operation of the refrigeration cycle. Furthermore, by directing the ambient air stream 130 over the one or more evaporator coils 44, the water vapor of the ambient air stream 130 may be condensed into a water reservoir (shown below in FIG. 4). Accordingly, the water recovery system 10 may recover additional water from the ambient air stream 130 by selectively activating the refrigeration system 13 and simultaneously collecting the water vapor from the ambient air stream 130 using the plurality of desiccant stacks 74.

While the above embodiments illustrate activating both the one or more dampers 26 and the one or more dampers 135, it should be understood that the one or more dampers 26 and the one or more dampers 135 may be selectively activated in some embodiments. As a non-limiting example, only the one or more dampers 135 may be activated in some embodiments. As another non-limiting example, the one or more dampers 26 may be activated in some embodiments.

Figure 3C:
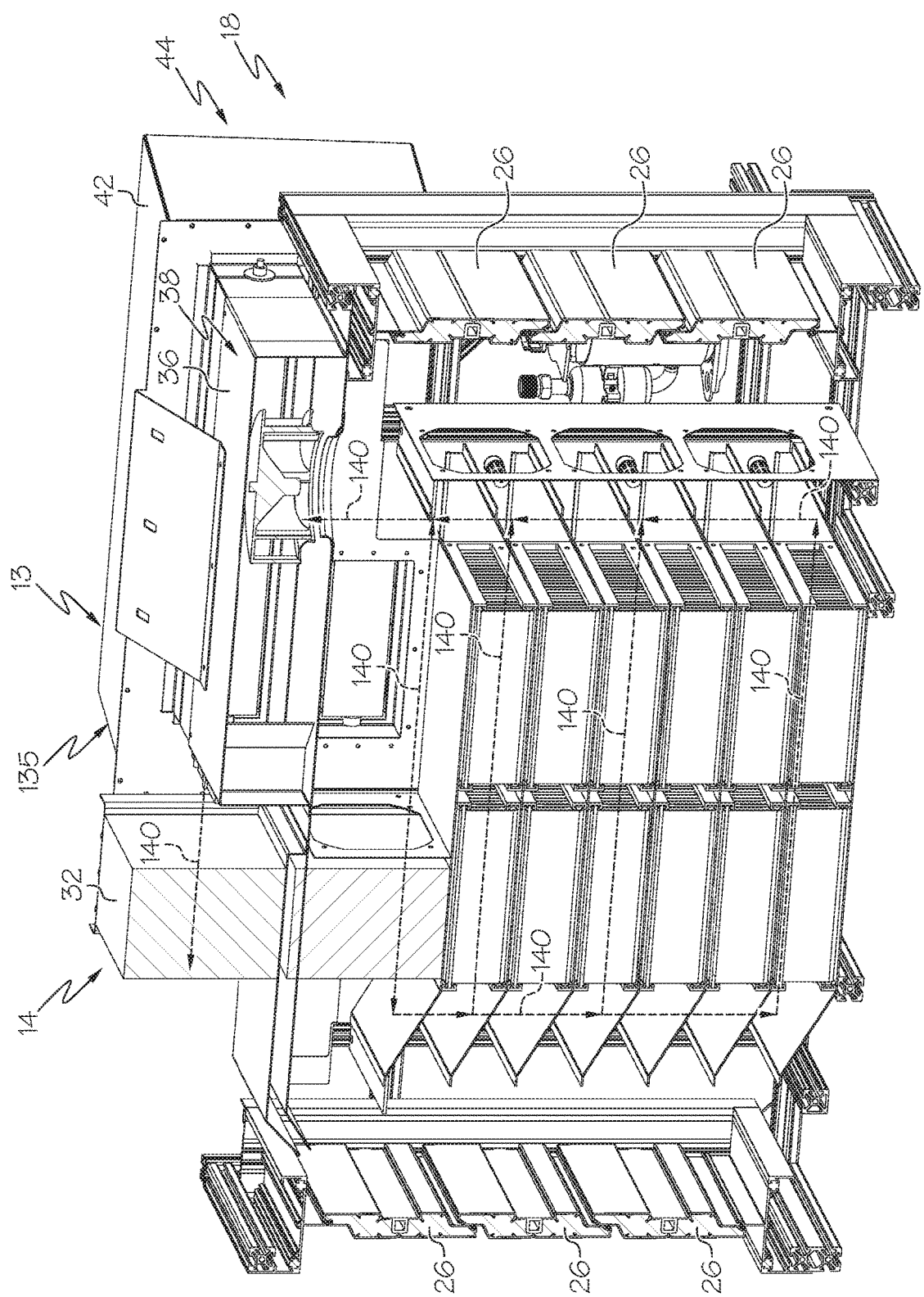
FIG. 3C schematically depicts another perspective view of the water recovery system according to one or more embodiments shown and described herein.

With reference to FIG. 3C, a perspective of the water recovery system 10 is schematically depicted. As described above, by setting the one or more dampers 26 to the closed position when the water recovery system 10 is in the extraction mode, the refrigeration system 13 may provide energy within the chamber 28 to vaporize the water from the plurality of desiccant stacks 74. In some embodiments, the evaporator 18, the compressor 22, and the internal condenser 20 may be activated when the water recovery system 10 is set to the extraction mode. When the water recovery system 10 is set to the extraction mode, the compressor 22 may begin executing the refrigeration cycle by compressing a liquid refrigerant (e.g., Freon) and outputting the refrigerant to the internal condenser 20 as a superheated vapor. Subsequently, the internal condenser 20 may cool the superheated vapor and condense the vapor refrigerant by removing additional heat at constant pressure and temperature. The liquid refrigerant exiting the internal condenser 20 may be provided to the evaporator 18 through an expansion valve (shown below in FIG. 4), which is configured to lower the pressure of the liquid refrigerant exiting the internal condenser 20. Lowering the pressure of the liquid refrigerant causes a portion of the refrigerant to transition into a vapor refrigerant. The liquid refrigerant and vapor refrigerant mixture is then provided to the evaporator 18, which is configured to vaporize the refrigerant by cooling the surrounding air of the refrigeration system 13. The vapor refrigerant is subsequently provided to the compressor 22, which may repeat the refrigeration cycle by compressing the vapor refrigerant and then converting the vapor refrigerant into a superheated vapor.

When the internal condenser 20 condenses the vapor refrigerant during the extraction mode, the internal condenser 20 may generate and provide heat into the chamber 28 and/or within the internal condenser housing 46. While the above embodiment illustrates the internal condenser 20 generating and providing the heat, it should be understood that in other embodiments, additional components may be utilized to generate and provide the heat including, but not limited to, the compressor 22, the auxiliary condenser 14, and/or an electronic circuit configured to generate heat.

By orienting the internal condenser 20 such that the generated heat is provided to the plurality of desiccant stacks 74, the water vapor collected by the plurality of desiccant stacks 74 may be released into a closed loop air stream 140. During the extraction mode, the plurality of desiccant stack fans 132 and the centrifugal fan 38 are configured to direct the closed loop air stream 140 into the evaporator housing 42 and over the one or more evaporator coils 44 of the evaporator 18. By directing the closed loop air stream 140 over the one or more evaporator coils 44, the evaporator 18 may vaporize the refrigerant, thereby enabling proper operation of the refrigeration cycle. Furthermore, by directing the closed loop air stream 140 over the one or more evaporator coils 44, the water vapor of the closed loop air stream 140 may be condensed into the water reservoir (shown below in FIG. 4). Accordingly, the water recovery system 10 may recover additional water from the closed loop air stream 140 by selectively activating the refrigeration system 13 and simultaneously condensing the water vapor of the closed loop air stream 140 using the plurality of desiccant stacks 74.

In some embodiments, the auxiliary condenser 14 may be selectively activated in addition to the internal condenser 20 when the water recovery system 10 is in the extraction mode. As a non-limiting example, the controller may be configured to determine one or more operating temperatures associated with at least one of the evaporator 18 and the internal condenser 20. If the one or more operating temperatures indicate that the water recovery system 10 is operating above a threshold operating temperature, the controller may activate the auxiliary condenser 14 in order to release excess heat from the water recovery system 10. Activating the auxiliary condenser during the extraction mode of the water recovery system 10 is described below in further detail with reference to FIGS. 4-7.

Figure 4:
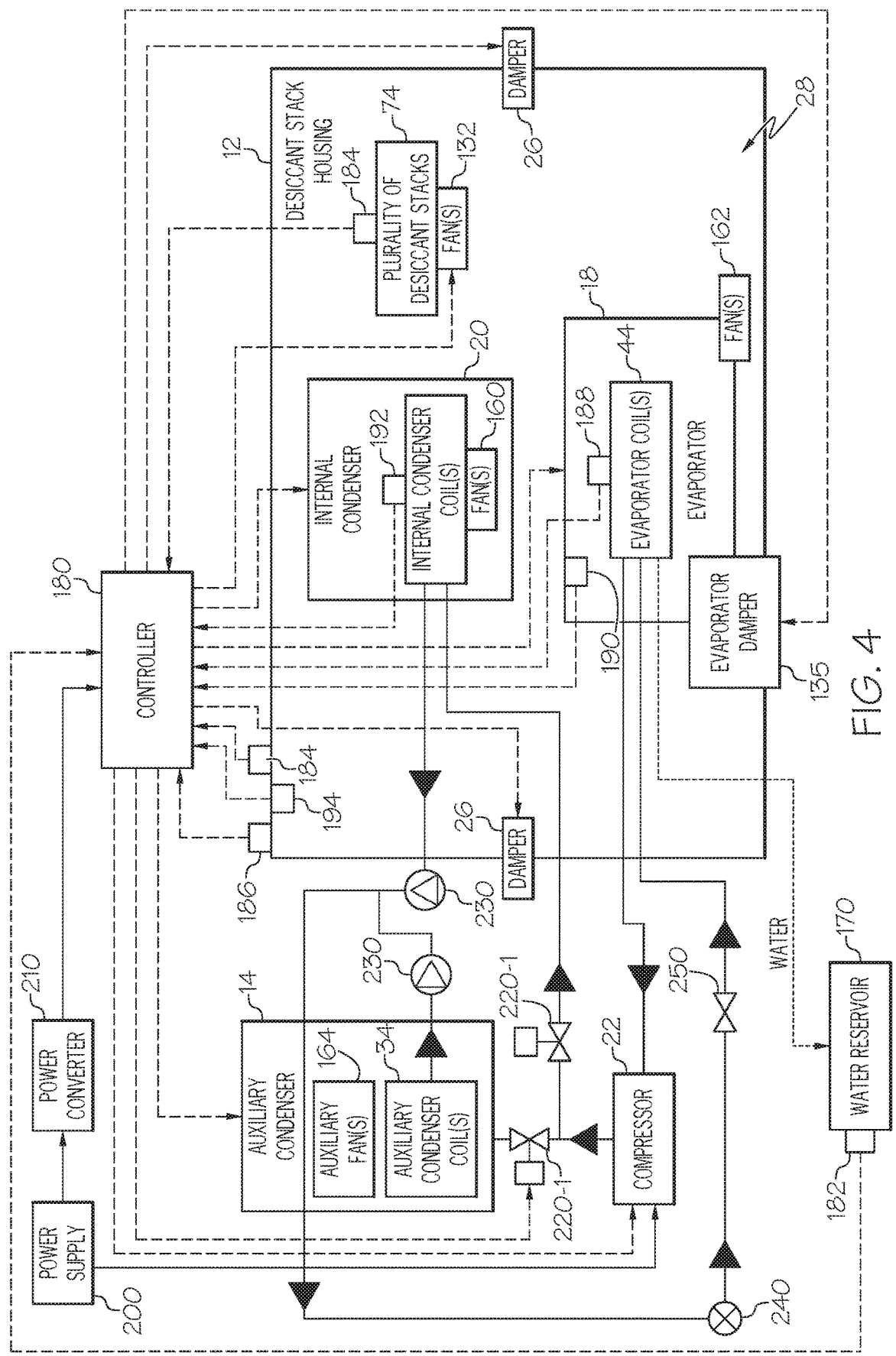
FIG. 4 schematically depicts a functional block diagram of an example water recovery system according to one or more embodiments shown and described herein.

With reference to FIG. 4, a functional block diagram of the water recovery system 10 is schematically depicted. In some embodiments, the internal condenser 20 includes one or more internal condenser fans 160, the evaporator 18 includes one or more evaporator fans 162, and the auxiliary condenser 14 includes one or more auxiliary fans 164. The one or more internal condenser fans 160 of the internal condenser 20 may be configured to direct heat energy generated by the internal condenser 20 into the plurality of desiccant stacks 74 when the water recovery system 10 is in the extraction mode. The one or more evaporator fans 162 of the evaporator 18 may be configured to direct the ambient air stream 130 received through the one or more dampers 135 over the one or more evaporator coils 44. The one or more auxiliary fans 164 of the auxiliary condenser 14 may be configured to direct heat energy directed by the internal condenser 20 and the auxiliary condenser 14 outside of the desiccant stack housing 12.

In various embodiments, the water recovery system 10 includes a water reservoir 170 that is configured to receive water condensed by the evaporator 18 during one of the absorption mode and the extraction mode. While the water reservoir 170 is illustrated as external to the desiccant stack housing 12, it should be understood that the water reservoir 170 may be located within the desiccant stack housing 12 in other embodiments.

In some embodiments, the water recovery system 10 includes a controller 180, which includes one or more processing devices and/or one or more memories. In some embodiments, the one or more memories may include a non-transitory computer-readable medium, such as random access memory (RAM), read-only memory (ROM), flash memory, or one or more different types of portable electronic memory, such as discs, DVDs, CD-ROMs, or the like, or any suitable combination of these types of memory. The one or more processing devices may carry out programming instructions stored on the one or more memories, thereby causing operation of the water recovery system 10. That is, the one or more processing devices and the one or more memories may be configured to carry out the various processes described herein with respect to the water recovery system 10.

A non-limiting example process includes determining an amount of water in the water recovery system 10 based on data obtained by at least one of a level sensor 182 of the water reservoir 170 and a water vapor sensor 184 of the plurality of desiccant stacks 74. Additional non-limiting processes include, but are not limited to, determining a power consumption of the water recovery system 10 and determining a power stored of the water recovery system 10. Additional non-limiting processes include, but are not limited to, determining an ambient temperature based on data obtained by temperature sensor 186, determining a temperature of the chamber 28 based on data obtained by temperature sensor 187, determining an evaporator coil temperature based on data obtained by temperature sensor 188, determining a post-evaporator temperature (i.e., an air temperature near or adjacent to the evaporator coils 44) based on data obtained by temperature sensor 190, and determining a temperature of the one or more internal condenser coils 48 based on data obtained by temperature sensor 192. Further non-limiting examples include determining a humidity (e.g., relative humidity) of the water recovery system 10 based on data obtained by humidity sensor 194, determining various pressures of the water recovery system 10 using pressure sensors, and determining ambient/internal illuminances of the water recovery system 10 using illuminance sensors. Additional non-limiting example processes include, but are not limited to, selectively activating the refrigeration system 13, opening and closing the one or more dampers 26 and the one or more dampers 135 configuring air flow paths of the water recovery system 10, controlling fan speeds of the water recovery system 10, and determining an operation mode of the water recovery system 10 (i.e., the absorption mode or the extraction mode).

The programming instructions run by the controller 180 (e.g., executed by the one or more processing devices and stored within the one or more memories) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

In some embodiments, the controller 180 and the compressor 22 may receive electrical power from a power supply 200. As a non-limiting example, the power supply 200 (e.g., a battery, power from an electrical grid, a solar panel, etc.) may be configured to provide alternating-current (AC) power to the compressor 22, and a power converter 210 (e.g., a transformer and rectifier network) may be configured to convert the AC power to a direct-current (DC) power having a voltage and current that is suitable for operating the controller 180. As another non-limiting example, the power supply 200 may be configured to provide DC power to the compressor 22, and the power converter 210 (e.g., a buck converter circuit) may be configured to convert adjust the voltage and/or current of the DC signal such that it is suitable for operating the controller 180.

In some embodiments, the refrigeration system 13 may include additional components, such as solenoid valves 220-1, 220-2, check valves 230, a binary pressure switch 240, and a thermal expansion valve 250. The solenoid valves 220-1, 220-2 may be configured to selectively activate at least one of the auxiliary condenser 14 and the internal condenser 20 based on the operating mode of the water recovery system 10. As a non-limiting example, when the water recovery system 10 is in the absorption mode, the controller 180 may activate solenoid valve 220-1, thereby enabling superheated vapor exiting from the compressor 22 to be provided to the auxiliary condenser 14. Furthermore, when the water recovery system 10 is in the absorption mode, the controller 180 may deactivate solenoid valve 220-2, thereby preventing superheated vapor exiting from the compressor 22 to be provided to the internal condenser 20.

As another non-limiting example, when the water recovery system 10 is in the extraction mode, the controller 180 may activate solenoid valve 220-2, thereby enabling superheated vapor exiting from the compressor 22 to be provided to the internal condenser 20. Furthermore, if the temperature of the one or more internal condenser coils 48 exceeds a threshold temperature (as described below in further detail with reference to FIG. 7), the controller 180 may activate solenoid valve 220-1. Accordingly, superheated vapor exiting from the compressor 22 may be provided to both the auxiliary condenser 14 and the internal condenser 20 in order to reduce a temperature of the one or more internal condenser coils 48 during the extraction mode.

In some embodiments, the check valves 230 are configured to ensure proper liquid flow direction by ensuring that liquid refrigerant exiting the auxiliary condenser 14 and the internal condenser 20 are provided to the binary pressure switch 240 and the thermal expansion valve 250. The binary pressure switch 240 may be configured to turn off the refrigeration system 13 when a pressure of liquid refrigerant exceeds a maximum threshold pressure or is less than a minimum threshold pressure. The thermal expansion valve 250 may be configured to lower the pressure of the liquid refrigerant exiting from at least one of the auxiliary condenser 14 and the internal condenser 20. As described above, lowering the pressure of the liquid refrigerant causes a portion of the refrigerant to transition into a vapor refrigerant. In some embodiments, the refrigeration system 13 may include a filter drier (not shown), which may be configured to absorb system contaminants of and filtrate the liquid refrigerant exiting from at least one of the auxiliary condenser 14 and the internal condenser 20.

Figure 5:
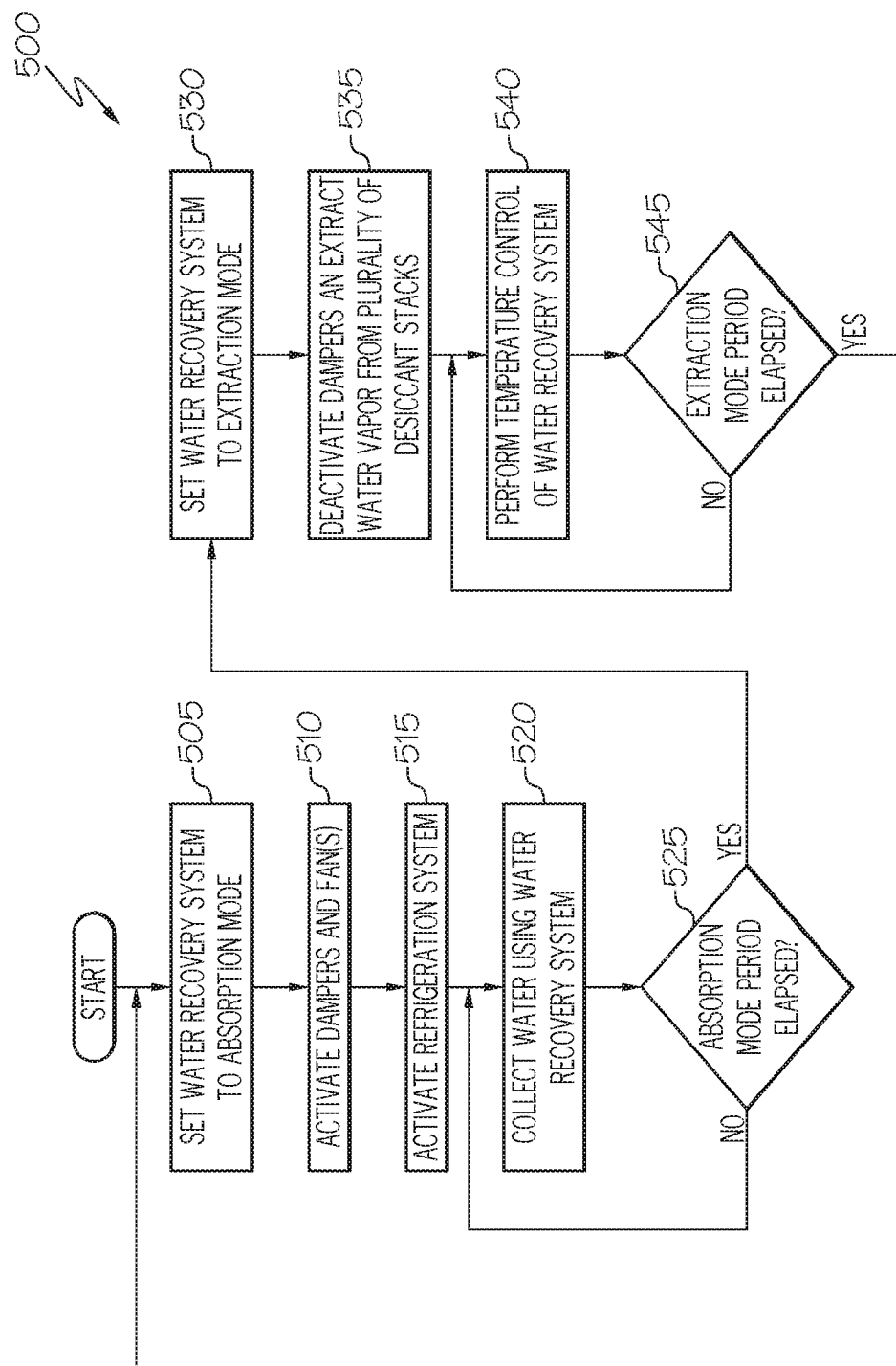
FIG. 5 depicts a flow diagram of an illustrative method for operating the water recovery system in one of an absorption mode and an extraction mode according to one or more embodiments shown and described herein.

With reference to FIG. 5, a flow diagram of an illustrative method 500 for operating the water recovery system 10 in one of the absorption mode and the extraction mode is illustrated. At block 505, the controller 180 sets the water recovery system 10 to the absorption mode. At block 510, the controller 180 activates the one or more dampers 26, the one or more dampers 135, the centrifugal fan 38, the one or more evaporator fans 162, and the one or more auxiliary fans 164. At block 515, the controller 180 activates at least a portion of the refrigeration system 13. As a non-limiting example, the evaporator 18, the compressor 22, and the auxiliary condenser 14 may be activated when the water recovery system 10 is in the absorption mode. At block 520, the water recovery system 10 collects water vapor from the ambient air stream 130 using the plurality of desiccant stacks 74. As described above, the water recovery system 10 may recover water from the ambient air stream 130 by selectively activating the refrigeration system 13 and simultaneously collect the water vapor from the ambient air stream 130 using the plurality of desiccant stacks 74. Furthermore, the water vapor of the ambient air stream 130 may be condensed into the water reservoir 170 using the one or more evaporator coils 44, as described above.

At block 525, the controller 180 determines whether an absorption mode period has elapsed, which is described below in further detail with reference to FIG. 6. If so, the method proceeds to block 530; otherwise, the method proceeds to block 520. At block 530, the controller 180 sets the water recovery system 10 to the extraction mode. At block 535, the controller 180 deactivates the one or more dampers 26 and the one or more dampers 135 and extracts the water vapor from the plurality of desiccant stacks 74 using the evaporator 18, the compressor 22, and the internal condenser 20. At block 540, the water recovery system 10 performs the temperature control process (i.e., selectively activating the auxiliary condenser 14 during the extraction mode), which is described below in further detail with reference to FIG. 7. At 545, the controller 180 determines whether an extraction mode period has elapsed, which is described below in further detail with reference to FIG. 7. If so, the method proceeds to block 505; otherwise, the method proceeds to block 540.

Figure 6:
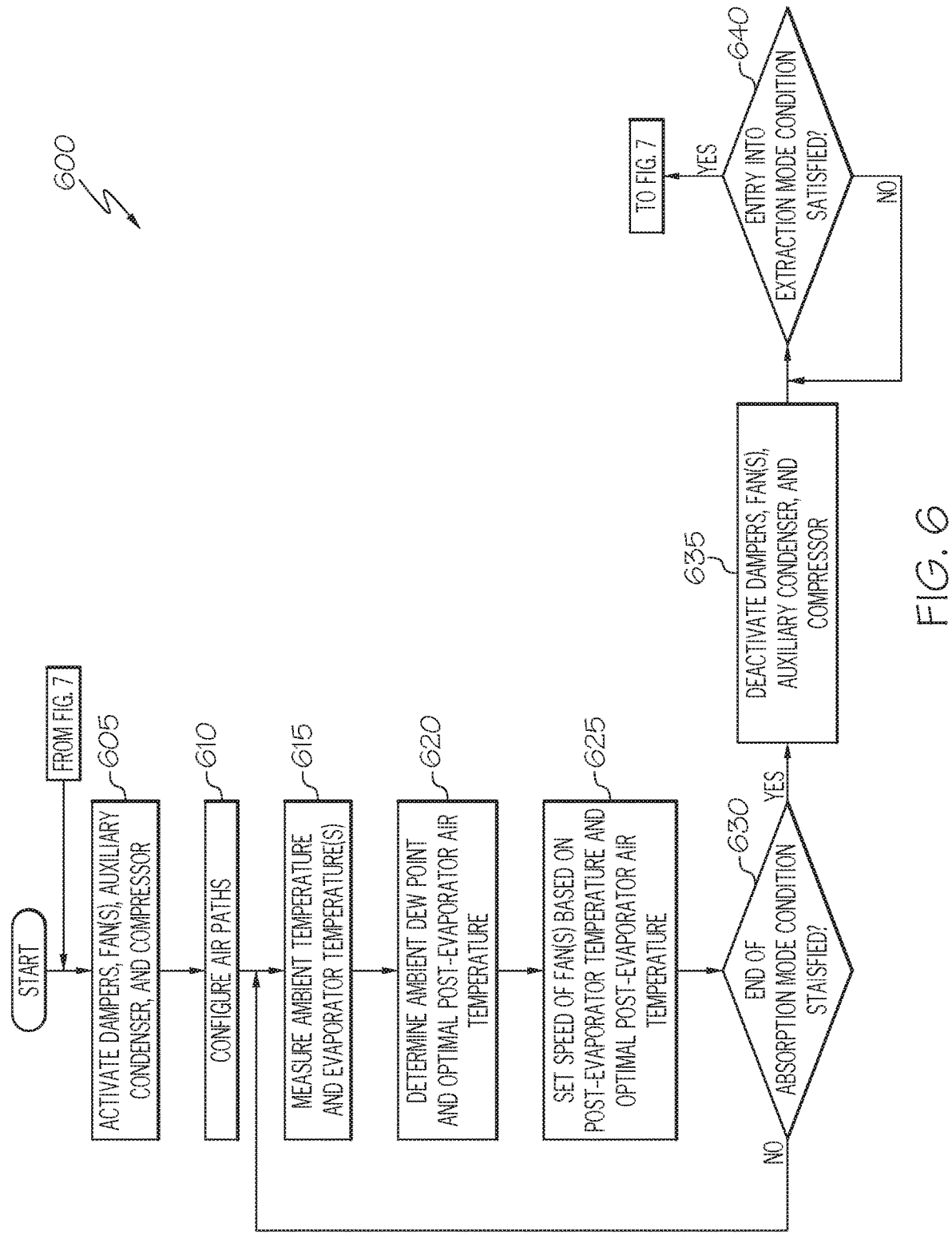
FIG. 6 depicts a flow diagram of an illustrative method for operating the water recovery system in an absorption mode according to one or more embodiments shown and described herein.

With reference to FIG. 6, a flow diagram of an illustrative method 600 for operating the water recovery system 10 in the absorption mode is illustrated. At block 605, the controller 180 activates the one or more dampers 26, the one or more dampers 135, the centrifugal fan 38, the one or more evaporator fans 162, the one or more auxiliary fans 164, the auxiliary condenser 14, and the compressor 22. At block 610, the controller 180 configures the air paths of the water recovery system 10. As a non-limiting example, the controller 180 may activate/deactivate one or more valves such that the centrifugal fan 38 and the one or more evaporator fans 162 may direct the ambient air stream 130 over the one or more evaporator coils 44. At block 615, the controller 180 measures an ambient temperature and one or more evaporator temperatures. As a non-limiting example, the controller 180 may measure the ambient temperature using the temperature sensor 186, measure the evaporator coil temperature using temperature sensor 188, and measure the post-evaporator temperature using the temperature sensor 190.

At block 620, the controller 180 may determine an ambient dew point and an optimal post-evaporator air temperature. In some embodiments, the controller 180 may determine an ambient relative humidity (i.e., an amount of moisture in the air divided by the maximum amount of possible moisture in the air at a specific temperature) of the water recovery system 10 based on data obtained by the humidity sensor 194 and the measured ambient temperature. Furthermore, the controller 180 may determine the optimal post-evaporator air temperature ($T_{OPT}$) based on the evaporator coil temperature ($T_{EC}$), a constant ($K_1$) between 0 and 1 (including endpoints), and the ambient dew point ($DP_{AMB}$) using the following relation:

$$T_{OPT}=T_{EC}+K_1*(DP_{AMB}-T_{EC}) \quad (1)$$

It should be understood that in other embodiments, the optimal post-evaporator air temperature ($T_{OPT}$) may be determined using various other relations.

At block 625, the controller 180 sets the speed of the centrifugal fan 38, the one or more evaporator fans 162, and/or the one or more auxiliary fans 164 based on the optimal post-evaporator air temperature ($T_{OPT}$). As a non-limiting example, the controller 180 may be configured to perform a proportional-integral-derivative (PID) function, where the setpoint is designated as the optimal post-evaporator air temperature ($T_{OPT}$), the process variable is designated as the post-evaporator air temperature, and the output control is designated as the fan speed of the centrifugal fan 38, the one or more evaporator fans 162, and/or the one or more auxiliary fans 164. As a non-limiting example, the controller 180 may increase the speed of the centrifugal fan 38, the one or more evaporator fans 162, and/or the one or more auxiliary fans 164 in response to optimal post-evaporator air temperature ($T_{OPT}$) being greater than the post-evaporator temperature. As another non-limiting example, the controller 180 may decrease the speed of the centrifugal fan 38, the one or more evaporator fans 162, and/or the one or more auxiliary fans 164 in response to optimal post-evaporator air temperature ($T_{OPT}$) being less than the post-evaporator temperature. It should be understood that other control processes may be implemented in order to set the speed of the centrifugal fan 38, the one or more evaporator fans 162, and/or the one or more auxiliary fans 164. Furthermore, it should be understood that the controller 180 may control other components of the refrigeration system 13 based on the optimal post-evaporator air temperature ($T_{OPT}$) in other embodiments, such as the speed of the compressor 22.

At block 630, the controller 180 determines whether a condition is satisfied corresponding to an end of the absorption mode. As non-limiting examples, a condition that indicates an end of the absorption mode includes at least one of a period of time of operating the water recovery system 10 in the absorption mode is greater than a threshold period of time (e.g., 8 hours), an energy consumption of the water recovery system 10 exceeds a threshold energy consumption, and an amount of water vapor absorbed by the plurality of desiccant stacks 74 exceeds a threshold amount. Another non-limiting example of a condition indicating an end of the absorption mode includes, but is not limited to, environment and/or ambient conditions indicating unsuitable operation of the water recovery system 10 in the absorption mode (e.g., current or future weather conditions transmitted to the controller 180 by a remote compute device via a network, and the future weather conditions indicate unsuitable environmental conditions for operating the water recovery system 10 in the absorption mode). Another non-limiting example of a condition indicating an end of the absorption mode includes, but is not limited to, a concentration of the liquid desiccant solution 110 exceeding or falling below a predetermined threshold concentration. If a condition is satisfied corresponding to an end of the absorption mode, the method 600 proceeds to block 635; otherwise, the method 600 proceeds to block 615.

At block 635, the controller 180 deactivates the one or more dampers 26, the one or more dampers 135, the centrifugal fan 38, the one or more evaporator fans 162, the one or more auxiliary fans 164, the auxiliary condenser 14, and the compressor 22. At block 640, the controller 180 determines whether a condition is satisfied corresponding to an entry into the extraction mode. Non-limiting examples of conditions satisfying an entry into the extraction mode include, but are not limited to, a predefined period of time elapsing after the end of the absorption mode, a predetermined time of day, an occurrence of a predetermined environmental condition, or a command from a remote computing device corresponding to an entry into the extraction mode. If a condition is satisfied corresponding to an entry into the extraction mode, the method 600 proceeds to block 705 in FIG. 7; otherwise, the method 600 remains at block 635 until a condition is satisfied corresponding to an entry into the extraction mode.

Figure 7:
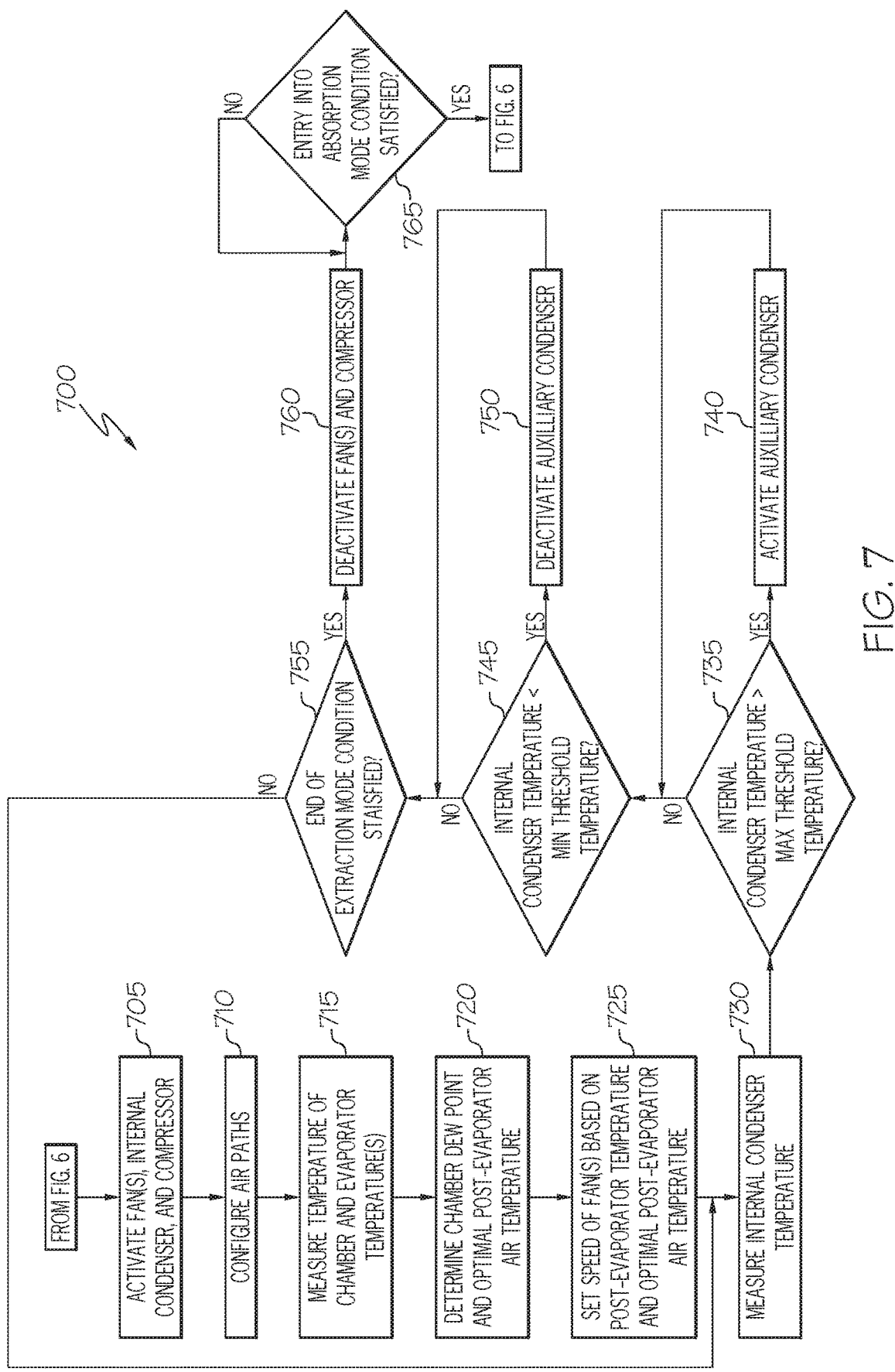
FIG. 7 depicts a flow diagram of an illustrative method for operating the water recovery system in an extraction mode according to one or more embodiments shown and described herein.

With reference to FIG. 7, a flow diagram of an illustrative method 700 for operating the water recovery system 10 in the extraction mode is illustrated. At block 705, the controller 180 activates the centrifugal fan 38, the one or more internal condenser fans 160, the one or more evaporator fans 162, the internal condenser 20, and the compressor 22. At block 710, the controller 180 configures the air paths of the water recovery system 10. As a non-limiting example, the controller 180 may activate/deactivate one or more valves such that the centrifugal fan 38, the one or more internal condenser fans 160, and the one or more evaporator fans 162 may direct the closed loop air stream 140 over the one or more evaporator coils 44. At block 715, the controller 180 measures a temperature of the chamber 28 and one or more evaporator temperatures. As a non-limiting example, the controller 180 may measure the ambient temperature using the temperature sensor 187, measure the evaporator coil temperature using temperature sensor 188, and measure the post-evaporator temperature using the temperature sensor 190.

At block 720, the controller 180 may determine a dew point of the chamber 28 and an optimal post-evaporator air temperature. In some embodiments, the controller 180 may determine a relative humidity (i.e., an amount of moisture in the air divided by the maximum amount of possible moisture in the air at a specific temperature) of the chamber 28 based on data obtained by the humidity sensor 194 and the measured temperature of the chamber 28. Furthermore, the controller 180 may determine the optimal post-evaporator air temperature ($T_{OPT}$) based on the evaporator coil temperature ($T_{EC}$), a constant ($K_1$) between 0 and 1 (including endpoints), and the dew point of the chamber ($DP_{DC}$) using the following relation:

$$T_{OPT}=T_{EC}+K_1*(DP_{DC}-T_{EC}) \qquad (2)$$

It should be understood that in other embodiments, the optimal post-evaporator air temperature ($T_{OPT}$) may be determined using various other relations.

At block 725, the controller 180 sets the speed of the centrifugal fan 38, the one or more internal condenser fans 160, and/or the one or more evaporator fans 162 based on the optimal post-evaporator air temperature ($T_{OPT}$). As a non-limiting example, the controller 180 may be configured to perform a proportional-integral-derivative (PID) function, where the setpoint is designated as the optimal post-evaporator air temperature ($T_{OPT}$), the process variable is designated as the post-evaporator air temperature, and the output control is designated as the fan speed of the centrifugal fan 38, the one or more internal condenser fans 160, and/or the one or more evaporator fans 162. As a non-limiting example, the controller 180 may increase the speed of the centrifugal fan 38, the one or more internal condenser fans 160, and/or the one or more evaporator fans 162 in response to optimal post-evaporator air temperature ($T_{OPT}$) being greater than the post-evaporator temperature. As another non-limiting example, the controller 180 may decrease the speed of the centrifugal fan 38, the one or more internal condenser fans 160, and/or the one or more evaporator fans 162 in response to optimal post-evaporator air temperature ($T_{OPT}$) being less than the post-evaporator temperature. It should be understood that other control processes may be implemented in order to set the speed of the centrifugal fan 38, the one or more internal condenser fans 160, and/or the one or more evaporator fans 162. Furthermore, it should be understood that the controller 180 may control other components of the refrigeration system 13 based on the optimal post-evaporator air temperature ($T_{OPT}$) in other embodiments, such as the speed of the compressor 22.

At block 730, the controller 180 measures a temperature of the one or more internal condenser coils 48 using the temperature sensor 192. At block 735, the controller 180 determines whether the temperature of the one or more internal condenser coils 48 is greater than a maximum threshold temperature (e.g., the temperature of the one or more internal condenser coils 48 causes an undesirable amount of refrigerant pressure in the refrigeration system 13). If so, the method 700 proceeds to block 740, where the controller 180 activates the auxiliary condenser 14 to expel heat from the water recovery system 10 and reduce the temperature of the one or more internal condenser coils 48, and then the method 700 proceeds to block 745. If the temperature of the one or more internal condenser coils 48 is less than the maximum threshold, the method 700 proceeds to block 745.

At block 745, the controller 180 determines whether the temperature of the one or more internal condenser coils 48 is less than a minimum threshold temperature (e.g., the temperature of the one or more internal condenser coils 48 causes the refrigerant pressure in the refrigeration system 13 to fall below a minimum pressure for operating the refrigeration system 13). If so, the method 700 proceeds to block 750, where the controller 180 deactivates the auxiliary condenser 14 and then proceeds to block 755. If the temperature of the one or more internal condenser coils 48 is greater than the minimum threshold temperature, then the method 700 proceeds to block 755.

At block 755, the controller 180 determines whether a condition is satisfied corresponding to an end of the extraction mode. As non-limiting examples, a condition that indicates an end of the extraction mode includes at least one of a period of time of operating the water recovery system 10 in the extraction mode is greater than a threshold period of time (e.g., 8 hours), an energy consumption of the water recovery system 10 exceeds a threshold energy consumption, and an amount of water vapor in the plurality of desiccant stacks 74 being greater than a threshold amount. Another non-limiting example of a condition indicating an end of the extraction mode includes, but is not limited to, environment and/or ambient conditions indicating unsuitable operation of the water recovery system 10 in the extraction mode (e.g., current or future weather conditions transmitted to the controller 180 by a remote compute device via a network, and the future weather conditions indicate unsuitable environmental conditions for operating the water recovery system 10 in the extraction mode). Another non-limiting example of a condition indicating an end of the absorption mode includes, but is not limited to, a concentration of the liquid desiccant solution 110 exceeding or falling below a predetermined threshold concentration. If a condition is satisfied corresponding to an end of the absorption mode, the method 700 proceeds to block 760; otherwise, the method 700 proceeds to block 730.

At block 760, the controller 180 deactivates the centrifugal fan 38, the one or more internal condenser fans 160, the one or more evaporator fans 162, and the compressor 22. At block 765, the controller 180 determines whether a condition is satisfied corresponding to an entry into the absorption mode. Non-limiting examples of conditions satisfying an entry into the extraction mode include, but are not limited to, a predefined period of time elapsing after the end of the extraction mode, a predetermined time of day, an occurrence of a predetermined environmental condition, or a command from a remote computing device corresponding to an entry into the absorption mode. If a condition is satisfied corresponding to an entry into the extraction mode, the method 700 proceeds to block 605 of FIG. 6; otherwise, the method 700 remains at block 765 until a condition is satisfied corresponding to an entry into the extraction mode.

FIG. 8 schematically depicts the controller 180 of the water recovery system 10 according to one or more embodiments shown and described herein. The controller 180 generally includes a communication interface 810, one or more processors 820, input/output hardware 830, network interface hardware 840, a data storage component 850, and one or more non-transitory computer-readable mediums 860. The components of the controller 180 may be physically and/or communicatively coupled through the communication interface 810. In some embodiments, the various components of the water recovery system 10 may be physically and/or communicatively coupled to the controller 180 through the communication interface 810.

The communication interface 810 is formed from any medium that is configured to transmit a signal. As non-limiting examples, the communication interface 810 is formed of conductive wires, conductive traces, optical waveguides, or the like. The communication interface 810 may also refer to the expanse in which electromagnetic radiation and their corresponding electromagnetic waves traverses. Moreover, the communication interface 810 may be formed from a combination of mediums configured to transmit signals. In one embodiment, the communication interface 810 comprises a combination of conductive traces, conductive wires, connectors, and buses that cooperate to permit the transmission of electrical data signals to and from the various components of the controller 180. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The one or more processors 820 may be any device of capable of executing machine-readable instructions stored in the one or more non-transitory computer-readable mediums 860. As a non-limiting example, the one or more processors 820 may be one of a shared processor circuit, dedicated processor circuit, or group processor circuit. As described herein, the term shared processor circuit refers to a single processor circuit that executes some or all machine-readable instructions from multiple modules. As described herein, the term group processor circuit refers to a processor circuit that, in combination with additional processor circuits, executes some or all machine-executable instructions from the multiple modules. References to multiple processor circuits encompass multiple processor circuits on discrete dies, multiple processor circuits on a single die, multiple cores of a single processor circuit, multiple threads of a single processor circuit, or a combination of the above.

The input/output hardware 830 may refer to a basic input/output system (BIOS) that interacts with hardware of the controller 180, device drivers that interact with particular devices of the controller 180, one or more operating systems, user applications, background services, background applications, etc.

The network interface hardware 840 may include and/or be configured to communicate with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices.

The data storage component 850 is communicatively coupled to the one or more processors 820 and may include information corresponding to various parameters of the water recovery system 10, such as threshold temperatures, the one or more conditions indicating an entry into one of the absorption and extraction modes, a threshold humidity, and/or the like. As a non-limiting example, the data storage component 850 may include one or more database servers that support NoSQL, MySQL, Oracle, SQL Server, NewSQL, or the like.

The one or more non-transitory computer-readable mediums 860 are communicatively coupled to the one or more processors 820. As a non-limiting example, one or more non-transitory computer-readable mediums 860 may be one of a shared memory circuit, dedicated memory circuit, or group memory circuit. As described herein, the term shared memory circuit refers to a single memory circuit that stores some or all machine-readable instructions from the multiple modules. As described herein, the term group memory circuit refers to a memory circuit that, in combination with additional memories, stores some or all machine-readable instructions from the multiple modules.

It should be understood by the above embodiments that by incorporating refrigeration systems into a water recovery system, as described herein, the water recovery system may recover additional water from an ambient air stream by selectively activating the refrigeration system and simultaneously collecting the water vapor from the ambient air stream 130 using the plurality of desiccant stacks. Furthermore, by incorporating the refrigeration system within the water recovery system, as described herein, the water recovery system may recover additional water from the closed loop air stream by selectively activating the refrigeration system and simultaneously condensing the water vapor of the closed loop air stream using the plurality of desiccant stacks.

The flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of operating a water recovery system comprising:
activating, by one or more processors, a plurality of dampers, a fan, and a refrigeration system of the water recovery system wherein the water recovery system operates in an absorption mode or an extraction mode;
measuring, by the one or more processors, an ambient air temperature of the water recovery system based on data obtained from an ambient air temperature sensor;
measuring, by the one or more processors, one or more evaporator temperatures associated with an evaporator of the water recovery system based on data obtained from one or more evaporator temperature sensors;
determining, by the one or more processors, an optimal evaporator air temperature of the water recovery system based on the one or more evaporator temperatures and the ambient air temperature; and
setting, by the one or more processors, a speed of the fan of the water recovery system based on the optimal evaporator air temperature.

2. The method of claim 1, further comprising:
determining, by the one or more processors, whether the water recovery system corresponds to one or more conditions; selected from the group consisting of a period of time of operating the water recovery system in a first operation mode is greater than a threshold period of time; a weather condition corresponding to a transition to the second operation mode; a concentration of a liquid desiccant solution of the water recovery system corresponding to the transition to the second operation modes; an energy consumption of the water recovery system exceeding a threshold energy consumption and an amount of water vapor absorbed by a desiccant stack of the water recovery system exceeding a threshold amount of water vapor and setting, by the one or more processors, the water recovery system from a first operation mode to a second operation mode in response to determining the operating characteristic of the water recovery system corresponds to the one or more conditions.

3. The method of claim 1, wherein activating the refrigeration system comprises activating, by the one or more processors, a compressor of the refrigeration system.

4. The method of claim 1, wherein measuring the one or more evaporator temperatures associated with the evaporator of the water recovery system based on the data obtained from the one or more evaporator temperature sensors further comprises:

measuring, by the one or more processors, an evaporator coil temperature based on data obtained from an evaporator coil temperature sensor.

5. The method of claim 4, further comprising:

measuring, by the one or more processors, an ambient relative humidity of the water recovery system based on data obtained from a humidity sensor;

determining, by the one or more processors, an ambient dew point of the water recovery system based on the ambient relative humidity and the ambient air temperature; and determining, by the one or more processors, the optimal evaporator air temperature of the water recovery system based on the evaporator coil temperature and the ambient dew point.

6. The method of claim 1, wherein measuring the one or more evaporator temperatures associated with the evaporator of the water recovery system based on the data obtained from the one or more evaporator temperature sensors further comprises:

measuring, by the one or more processors, a post-evaporator temperature based on data obtained from a post-evaporator temperature sensor.

7. The method of claim 6, further comprising:

comparing, by the one or more processors, the optimal evaporator air temperature and the post-evaporator temperature; and setting, by the one or more processors, the speed of the fan based on a comparison of the optimal evaporator air temperature and the post-evaporator temperature.

8. The method of claim 7, wherein setting the speed of the fan based on the comparison of the optimal evaporator air temperature and the post-evaporator temperature further comprises:

increasing, by the one or more processors, the speed of the fan in response to the optimal evaporator air temperature being greater than the post-evaporator temperature; and decreasing, by the one or more processors, the speed of the fan in response to the optimal evaporator air temperature being less than the post-evaporator temperature.

9. The method of claim 1, further comprising activating, by the one or more processors, one or more condensers of the refrigeration system.

10. A water recovery system comprising:

one or more processors; and one or more non-transitory memory modules communicatively coupled to the one or more processors and storing machine-readable instructions that, when executed, cause the one or more processors to:

activate a plurality of dampers, a fan, and a refrigeration system of the water recovery system;

measure an ambient air temperature of the water recovery system based on data obtained from an ambient air temperature sensor;

measure one or more evaporator temperatures associated with an evaporator of the water recovery system based on data obtained from one or more evaporator temperature sensors;

determine an optimal evaporator air temperature of the water recovery system based on the one or more evaporator temperatures and the ambient air temperature; and set a speed of the fan of the water recovery system based on the optimal evaporator air temperature.

11. The water recovery system of claim 10, wherein the machine-readable instructions, when executed, cause the one or more processors to:

determine whether an operating characteristic of the water recovery system corresponds to one or more conditions; and set the water recovery system from a first operation mode to a second operation mode in response to determining the operating characteristic of the water recovery system corresponds to the one or more conditions.

12. The water recovery system of claim 11, wherein the one or more conditions comprises at least one of:

a period of time of operating the water recovery system in the first operation mode is greater than a threshold period of time;

a weather condition corresponds to a transition to the second operation mode;

a concentration of a liquid desiccant solution of the water recovery system corresponds to the transition to the second operation mode;

an energy consumption of the water recovery system exceeds a threshold energy consumption; and an amount of water vapor absorbed by a desiccant stack of the water recovery system exceeds a threshold amount of water vapor.

13. The water recovery system of claim 10, wherein activating the refrigeration system causes the one or more processors to activate a compressor of the refrigeration system.

14. The water recovery system of claim 10, wherein measuring the one or more evaporator temperatures associated with the evaporator of the water recovery system based on the data obtained from the one or more evaporator temperature sensors causes the one or more processors to:

measure an evaporator coil temperature based on data obtained from an evaporator coil temperature sensor.

15. The water recovery system of claim 14, wherein the machine-readable instructions, when executed, cause the one or more processors to:

measure an ambient relative humidity of the water recovery system based on data obtained from a humidity sensor;

determine an ambient dew point of the water recovery system based on the ambient relative humidity and the ambient air temperature; and determine the optimal evaporator air temperature of the water recovery system based on the evaporator coil temperature and the ambient dew point.

16. The water recovery system of claim 10, wherein measuring the one or more evaporator temperatures associated with the evaporator of the water recovery system based on the data obtained from the one or more evaporator temperature sensors causes the one or more processors to:
- measure a post-evaporator temperature based on data obtained from a post-evaporator temperature sensor.

17. The water recovery system of claim 16, wherein the machine-readable instructions, when executed, cause the one or more processors to:
- compare the optimal evaporator air temperature and the post-evaporator temperature; and
- set the speed of the fan based on a comparison of the optimal evaporator air temperature and the post-evaporator temperature.

18. The water recovery system of claim 17, wherein setting the speed of the fan based on the comparison of the optimal evaporator air temperature and the post-evaporator temperature causes the one or more processors to:
- increase the speed of the fan in response to the optimal evaporator air temperature being greater than the post-evaporator temperature; and
- decrease the speed of the fan in response to the optimal evaporator air temperature being less than the post-evaporator temperature.

19. The water recovery system of claim 10, wherein activating the refrigeration system causes the one or more processors to activate one or more condensers of the refrigeration system.

* * * * *